United States Patent
Lu et al.

(10) Patent No.: US 12,483,969 B2
(45) Date of Patent: Nov. 25, 2025

(54) SUPPORT FOR DATA FORWARDING

(71) Applicant: Telefonaktiebolaget LM Ericsson (publ), Stockholm (SE)

(72) Inventors: Yunjie Lu, Shanghai (CN); Yong Yang, Kållered (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 344 days.

(21) Appl. No.: 17/926,275

(22) PCT Filed: May 20, 2021

(86) PCT No.: PCT/EP2021/063534
§ 371 (c)(1),
(2) Date: Nov. 18, 2022

(87) PCT Pub. No.: WO2021/234117
PCT Pub. Date: Nov. 25, 2021

(65) Prior Publication Data
US 2023/0247524 A1    Aug. 3, 2023

(30) Foreign Application Priority Data

May 20, 2020   (WO) ................ PCT/CN2020/091315

(51) Int. Cl.
H04W 40/36      (2009.01)
H04W 36/02      (2009.01)

(52) U.S. Cl.
CPC ........... *H04W 40/36* (2013.01); *H04W 36/02* (2013.01)

(58) Field of Classification Search
CPC ..... H04W 40/36; H04W 40/02; H04W 36/02; H04W 36/12; H04W 36/00; H04W 36/32;
(Continued)

(56) References Cited

U.S. PATENT DOCUMENTS 9,078,183 B2 *   7/2015  Lim ..................... H04W 36/02
10,616,934 B2 *  4/2020  Talebi Fard .......... H04W 48/00
(Continued)

FOREIGN PATENT DOCUMENTS

WO    2019031941 A1    2/2019

OTHER PUBLICATIONS

Ericsson, "C4-191404: Vendor-Specific IEs in NF Profile," 3GPP TSG-CT WG4 Meeting #90, Apr. 8-12, 2019, Xi'an, China, 5 pages.
(Continued)

*Primary Examiner* — Man U Phan
(74) *Attorney, Agent, or Firm* — Withrow & Terranova, PLLC

(57) ABSTRACT

The present disclosure proposes network elements (NEs), methods at NEs for facilitating data forwarding, and a telecommunications system comprising the NEs. The method at a first network element for facilitating data forwarding may comprise: receiving, from a second network element, a first message comprising a first indicator indicating that a data forwarding function is supported by the second network element. Further, the first message may be a first request message which requests registering, at the first network element, one or more functions of the second network element comprising the data forwarding function. Further, the method may further comprise transmitting, to the second network element, a first response message comprising a second indicator indicating success of the registration.

2 Claims, 8 Drawing Sheets

(58) Field of Classification Search
CPC ..... H04W 36/14; H04W 36/08; H04W 48/18; H04W 76/12; H04W 76/11; H04W 76/32; H04W 76/22; H04W 60/00; H04L 69/22; H04L 45/30; H04L 45/74; H04L 65/10; H04L 12/14; H04L 65/80; H04L 49/00
USPC .......................................................... 370/331
See application file for complete search history.

(56) References Cited

U.S. PATENT DOCUMENTS

| | | | | |
|---|---|---|---|---|
| 10,660,004 | B2* | 5/2020 | Kim | H04W 36/38 |
| 10,993,105 | B2* | 4/2021 | Tang | H04W 28/24 |
| 11,070,627 | B2* | 7/2021 | Talebi Fard | H04L 67/147 |
| 11,082,815 | B2* | 8/2021 | Park | H04W 4/80 |
| 11,102,828 | B2* | 8/2021 | Talebi Fard | H04W 72/04 |
| 11,115,350 | B2* | 9/2021 | Tan | H04M 15/64 |
| 11,153,787 | B2* | 10/2021 | Xu | H04W 36/0033 |
| 11,160,137 | B2* | 10/2021 | Jain | H04W 8/08 |
| 11,343,653 | B2* | 5/2022 | Talebi Fard | H04W 8/186 |
| 11,438,811 | B2* | 9/2022 | Yang | H04W 36/0066 |
| 11,871,291 | B2* | 1/2024 | Shan | H04W 76/12 |
| 2020/0154320 | A1 | 5/2020 | Xu et al. | |

OTHER PUBLICATIONS

Ericsson, "C4-203241: UPF for Data Forwarding," 3GPP TSG-CT WG4 Meeting #98e, Jun. 2-12, 2020, Electronic Meeting, 26 pages.

Decision to Grant for Japanese Patent Application No. 2022-569501, mailed May 14, 2024, 6 pages.

Author Unknown, "Technical Specification Group Core Network and Terminals; Numbering, addressing and dentification; (Release 16)," Technical Specification 23.003, Version 16.2.0, Mar. 2020, 3GPP Organizational Partners, 140 pages.

Author Unknown, "Technical Specification Group Services and System Aspects; Procedures for the 5G System (5GS); Stage 2 (Release 16)," Technical Specification 23.502, Version 16.4.0, Mar. 2020, 3GPP Organizational Partners, 582 pages.

Author Unknown, "Technical Specification Group Core Network and Terminals; Interface between the Control Plane and the User Plane Nodes; Stage 3 (Release 16)," Technical Specification 29.244, Version 16.3.1, Apr. 2020, 3GPP Organizational Partners, 297 pages.

Author Unknown, "Technical Specification Group Core Network and Terminals; Domain Name System Procedures; Stage 3; (Release 16)," Technical Specification 29.303, Version 16.2.0, Mar. 2020, 3GPP Organizational Partners, 79 pages.

Author Unknown, "Technical Specification Group Core Network and Terminals; 5G System; Network Function Repository Services; Stage 3 (Release 16)," Technical Specification 29.510, Version 16.3.0, Mar. 2020, 3GPP Organizational Partners, 172 pages.

Nokia, et al., "R3-191347: (Tp for data forwarding BL CR for TS 38.300) Correction of direct data forwarding," 3GPP TSG-RAN WG3#103bis, Apr. 8-12, 2019, Xi'an, China, 5 pages.

International Search Report and Written Opinion for International Patent Application No. PCT/EP2021/063534, mailed Sep. 24, 2021, 13 pages.

* cited by examiner

SUPPORT FOR DATA FORWARDING

This application is a 35 U.S.C. § 371 national phase filing of International Application No. PCT/EP2021/063534, filed May 20, 2021, which claims the benefit of International Application No. PCT/CN2020/091315, filed May 20, 2020, the disclosures of which are incorporated herein by reference in their entireties.

TECHNICAL FIELD

The present disclosure is related to the field of telecommunication, and in particular, to network elements (NEs), methods at NEs for facilitating data forwarding, and a telecommunications system comprising the NEs.

BACKGROUND

In modern telecommunications networks, user equipments (UEs), such as mobile phones, tablets, laptops, etc., will typically be carried by their users to travel from one place to another, which may trigger a so called "handover" procedure. A handover procedure denotes the process in which a radio access network (RAN) changes its radio transmitters, radio access mode, or radio system, and in which a core network (CN) adjusts its configurations and re-routes data packets to/from the UE of interest, to allow the transmission of information as efficient as possible.

For example, a mobile phone user moves within his/her service provider's network, switching between cellular towers when he/she moves in and out of range of network towers, as well as when a user's device must switch technologies (from 3G to 4G or from 4G to 5G, for example) or even between operators themselves.

As one of the key requirements of a 5G system, data forwarding at the point of the handover helps to minimize jitter, data loss, and out-of-order delivery. In all handovers, solutions are implemented to execute the process quickly and smoothly.

For example, in a $3^{rd}$ Generation Partnership Project (3GPP)-compliant network, when a UE is moving from one location to another location with an active data connection (e.g. a Packet Data Network (PDN) connection/Protocol Data Unit (PDU) session), a specific tunnel for data forwarding is sometimes required to relay buffered data or subsequent data from a source cell to a target cell. In such a case, a Session Management Function (SMF) serving the UE may decide to set up an indirect forwarding tunnel between the source cell and the target cell.

Therefore, according to the current 3GPP standards, it is a problem for the SMF to identify a User Plane Function (UPF) which is dedicated for the data forwarding.

SUMMARY

According to a first aspect of the present disclosure, a method at a first network element for facilitating data forwarding is provided. The method comprises: receiving, from a second network element, a first message comprising a first indicator indicating that a data forwarding function is supported by the second network element.

In some embodiments, the first message is a first request message which requests registering, at the first network element, one or more functions of the second network element comprising the data forwarding function. In some embodiments, the method further comprises: transmitting, to the second network element, a first response message comprising a second indicator indicating success of the registration. In some embodiments, the first network element is a Network Repository Function (NRF), and the second network element is a User Plane Function (UPF) or Serving GateWay for User plane (SGW-U). In some embodiments, the first request message is a request message for Nnrf_NFManagement service, and the first response message is a response message for Nnrf_NFManagement service. In some embodiments, the first indicator is an attribute of the data type "UpfInfo" comprised in the first request message.

In some embodiments, the method further comprises: receiving, from a third network element, a second request message comprising a third indicator indicating a query for network elements having the data forwarding function. In some embodiments, the method further comprises: transmitting, to the third network element, a second response message comprising a list of one or more fourth indicators, each of the one or more fourth indicators indicating a network element having the data forwarding function. In some embodiments, the second network element is one of the one or more network elements indicated by the one or more fourth indicators. In some embodiments, the third network element is a Session Management Function (SMF), a Mobility Management Entity (MME), or a SGW for Control plane (SGW-C). In some embodiments, the second request message is a request message for Nnrf_NFDiscovery service, and the second response message is a response message for Nnrf_NFDiscovery service. In some embodiments, the third indicator is a Uniform Resource Indicator (URI) query parameter comprised in the second request message. In some embodiments, the first message comprises one or more fifth indicators indicating one or more network instances supported by the second network element for data forwarding. In some embodiments, for each of the one or more network elements indicated by the one or more fourth indicators, the second response message comprises one or more fifth indicators indicating one or more network instances supported by the corresponding network element for data forwarding. In some embodiments, each of the fifth indicators is an attribute of the data type "UpfInfo" comprised in the first request message or in the second response message.

In some embodiments, the first message is one of: a Packet Forwarding Control Plane (PFCP) Association Setup Request message; a PFCP Association Update Request message; a PFCP Association Setup Response message in response to a PFCP Association Setup Request message previously transmitted from the first network element to the second network element; and a PFCP Association Update Response message in response to a PFCP Association Setup Update message previously transmitted from the first network element to the second network element. In some embodiments, the first network element is a Control Plane (CP) function, and the second network element is a User Plane (UP) function. In some embodiments, the first indicator is an information element (IE) comprised in the first message. In some embodiments, the first message comprises one or more fifth indicators indicating one or more network instances supported by the second network element for data forwarding. In some embodiments, each of the fifth indicators is an IE comprised in the first message.

In some embodiments, the first message further comprises a sixth indicator indicating a target area towards which IP connectivity is enabled by at least one of the network instances indicated by the fifth indicators. In some embodiments, the sixth indicator indicates a target area towards which IP connectivity is enabled by one of the network instances indicated by the fifth indicators. In some embodiments, the sixth indicator comprises a list of Tracking Area Information (TAI) or a list of NG-RAN IDs.

In some embodiments, the first network element is a Domain Name System (DNS) server. In some embodiments, the first message is a first request message which requests adding or updating a Name Authority PoinTeR (NAPTR) DNS record at the first network element, and the NAPTR DNS record indicates that the second network element or another network element supports the data forwarding function. In some embodiments, the method further comprises: receiving, from a third network element, a second request message comprising a third indicator indicating a query for network elements having the data forwarding function. In some embodiments, the method further comprises: transmitting, to the third network element, a second response message comprising a list of one or more fourth indicators, each of the one or more fourth indicators indicating a network element having the data forwarding function. In some embodiments, the second network element is one of the one or more network elements indicated by the one or more fourth indicators. In some embodiments, the third network element is one of an Mobility Management Entity (MME) and an SGW-C.

According to a second aspect of the present disclosure, a first network element is provided. The first network element comprises: a processor; a memory storing instructions which, when executed by the processor, cause the processor to perform any of the methods of the first aspect.

According to a third aspect of the present disclosure, a method at a second network element for facilitating data forwarding is provided. The method comprises: transmitting, to a first network element, a first message comprising a first indicator indicating that a data forwarding function is supported by the second network element.

In some embodiments, the first message is a first request message which requests registering, at the first network element, one or more functions of the second network element comprising the data forwarding function. In some embodiments, the method further comprises: receiving, from the first network element, a first response message comprising a second indicator indicating success of the registration. In some embodiments, the first network element is a Network Repository Function (NRF), and the second network element is a User Plane Function (UPF) or Serving GateWay for User plane (SGW-U). In some embodiments, the first request message is a request message for Nnrf_NFManagement service, and the first response message is a response message for Nnrf_NFManagement service. In some embodiments, the first indicator is an attribute of the data type "UpfInfo" comprised in the first request message. In some embodiments, the first message comprises one or more fifth indicators indicating one or more network instances supported by the second network element for data forwarding. In some embodiments, each of the fifth indicators is an attribute of the data type "UpfInfo" comprised in the first request message. In some embodiments, the first message is one of: a Packet Forwarding Control Plane (PFCP) Association Setup Request message; PFCP Association Update Request message; a PFCP Association Setup Response message in response to a PFCP Association Setup Request message previously transmitted from the first network element to the second network element; and a PFCP Association Update Response message in response to a PFCP Association Setup Update message previously transmitted from the first network element to the second network element.

In some embodiments, the first network element is a Control Plane (CP) function, and the second network element is a User Plane (UP) function. In some embodiments, the first indicator is an information element (IE) comprised in the first message. In some embodiments, the first message comprises one or more fifth indicators indicating one or more network instances supported by the second network element for data forwarding. In some embodiments, each of the fifth indicators is an IE comprised in the first message. In some embodiments, the first message further comprises a sixth indicator indicating a target area towards which IP connectivity is enabled by at least one of the network instances indicated by the fifth indicators. In some embodiments, the sixth indicator indicates a target area towards which IP connectivity is enabled by one of the network instances indicated by the fifth indicators. In some embodiments, the sixth indicator comprises a list of Tracking Area Information (TAI) or a list of NG-RAN IDs.

In some embodiments, the first network element is a Domain Name System (DNS) server. In some embodiments, the first message is a first request message which requests adding or updating a Name Authority PoinTeR (NAPTR) DNS record at the first network element, and the NAPTR DNS record indicates that the second network element or another network element supports the data forwarding function.

According to a fourth aspect of the present disclosure, a second network element is provided. The second network element comprises: a processor; a memory storing instructions which, when executed by the processor, cause the processor to perform any of the methods of the third aspect.

According to a fifth aspect of the present disclosure, a method at a third network element for facilitating data forwarding is provided. The method comprises: transmitting, to a first network element, a second request message comprising a third indicator indicating a query for network elements having a data forwarding function.

In some embodiments, the method further comprises: receiving, from the first network element, a second response message comprising a list of one or more fourth indicators, each of the one or more fourth indicators indicating a network element having the data forwarding function. In some embodiments, the third network element is a Session Management Function (SMF), Mobility Management Entity (MME), or a SGW for Control plane (SGW-C). In some embodiments, the second request message is a request message for Nnrf_NFDiscovery service, and the second response message is a response message for Nnrf_NFDiscovery service. In some embodiments, the third indicator is a Uniform Resource Indicator (URI) query parameter comprised in the second request message. In some embodiments, for each of the one or more network elements indicated by the one or more fourth indicators, the second response message comprises one or more fifth indicators indicating one or more network instances supported by the corresponding network element for data forwarding. In some embodiments, each of the fifth indicators is an attribute of the data type "UpfInfo" comprised in the second response message. In some embodiments, the first network element is a Control Plane (CP) function. In some embodiments, the first indicator is an information element (IE) comprised in the first message. In some embodiments, the method further comprises: selecting one of the one or more network elements indicated by the one or more fourth indicators based at least on the network instances supported by the one or more network elements and/or a location of an UE of interest. In some embodiments, the first network element is a Domain Name System (DNS) server.

According to a sixth aspect of the present disclosure, a third network element is provided. The third network element comprises: a processor; a memory storing instructions which, when executed by the processor, cause the processor to perform any of the methods of the fifth aspect.

According to a seventh aspect of the present disclosure, a telecommunications system is provided. The telecommunications system comprises: a first network element of the second aspect; a second network element of the fourth aspect; and a third network element of the sixth aspect.

According to an eight aspect of the present disclosure, a non-transitory computer readable storage medium storing instructions which, when executed by a processor, cause the processor to perform any of the methods described above.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and therefore are not to be considered limiting of its scope, the disclosure will be described with additional specificity and detail through use of the accompanying drawings.

DETAILED DESCRIPTION

Figure 1:
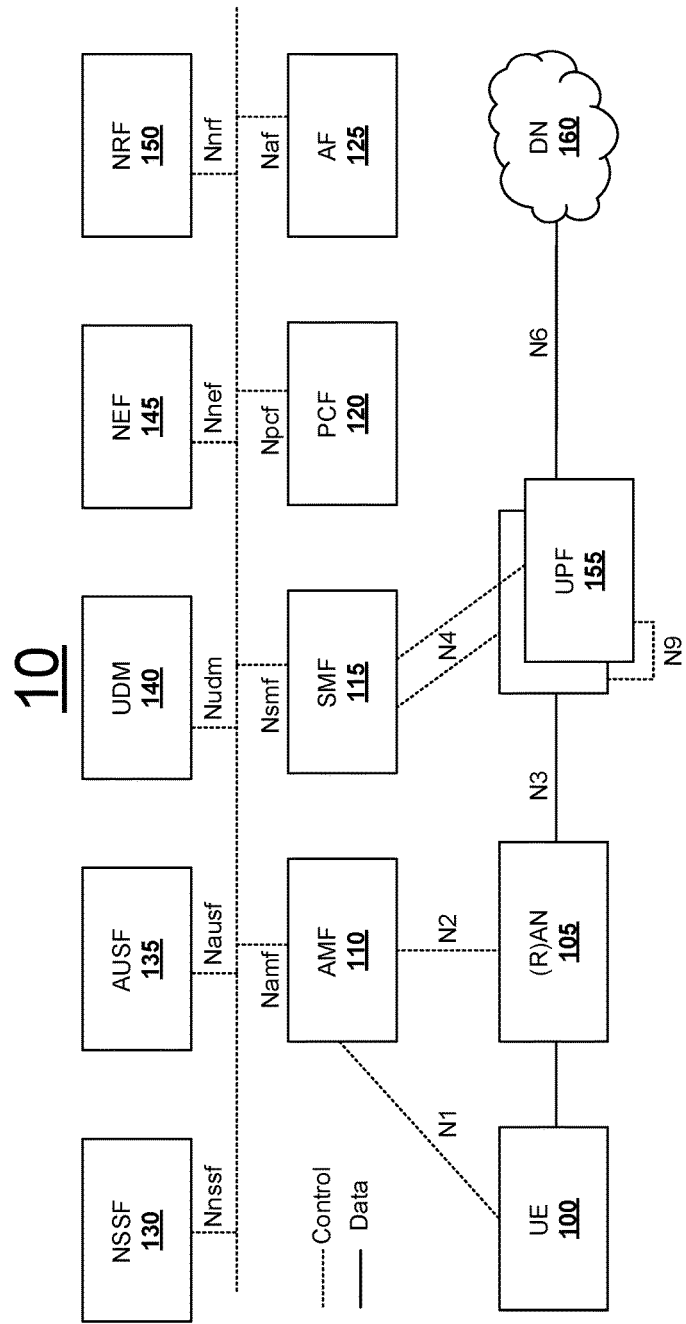
FIG. 1 is an overview diagram illustrating a typical 5G New Radio (NR) network architecture according to an embodiment of the present disclosure.

Hereinafter, the present disclosure is described with reference to embodiments shown in the attached drawings. However, it is to be understood that those descriptions are just provided for illustrative purpose, rather than limiting the present disclosure. Further, in the following, descriptions of known structures and techniques are omitted so as not to unnecessarily obscure the concept of the present disclosure.

Those skilled in the art will appreciate that the term "exemplary" is used herein to mean "illustrative," or "serving as an example," and is not intended to imply that a particular embodiment is preferred over another or that a particular feature is essential. Likewise, the terms "first", "second", "third", "fourth", "fifth", "sixth," and similar terms, are used simply to distinguish one particular instance of an item or feature from another, and do not indicate a particular order or arrangement, unless the context clearly indicates otherwise. Further, the term "step," as used herein, is meant to be synonymous with "operation" or "action." Any description herein of a sequence of steps does not imply that these operations must be carried out in a particular order, or even that these operations are carried out in any order at all, unless the context or the details of the described operation clearly indicates otherwise.

Conditional language used herein, such as "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below. In addition, language such as the phrase "at least one of X, Y and Z," unless specifically stated otherwise, is to be understood with the context as used in general to convey that an item, term, etc. may be either X, Y, or Z, or a combination thereof.

The terminology used herein is for the purpose of describing particular embodiments only and is not intended to be limitation of example embodiments. As used herein, the singular forms "a", "an", and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof. It will be also understood that the terms "connect(s)," "connecting", "connected", etc. when used herein, just mean that there is an electrical or communicative connection between two elements and they can be connected either directly or indirectly, unless explicitly stated to the contrary.

Of course, the present disclosure may be carried out in other specific ways than those set forth herein without departing from the scope and essential characteristics of the disclosure. One or more of the specific processes discussed below may be carried out in any electronic device comprising one or more appropriately configured processing circuits, which may in some embodiments be embodied in one or more application-specific integrated circuits (ASICs). In some embodiments, these processing circuits may comprise one or more microprocessors, microcontrollers, and/or digital signal processors programmed with appropriate software and/or firmware to carry out one or more of the operations described above, or variants thereof. In some embodiments, these processing circuits may comprise customized hardware to carry out one or more of the functions described above. The present embodiments are, therefore, to be considered in all respects as illustrative and not restrictive.

Although multiple embodiments of the present disclosure will be illustrated in the accompanying Drawings and described in the following Detailed Description, it should be understood that the disclosure is not limited to the disclosed embodiments, but instead is also capable of numerous rearrangements, modifications, and substitutions without departing from the present disclosure that as will be set forth and defined within the claims.

Further, please note that although the following description of some embodiments of the present disclosure is given in the context of 5G New Radio (NR), the present disclosure is not limited thereto. In fact, as long as data forwarding is involved, the inventive concept of the present disclosure may be applicable to any appropriate communication architecture, for example, to Global System for Mobile Communications (GSM)/General Packet Radio Service (GPRS), Enhanced Data Rates for GSM Evolution (EDGE), Code Division Multiple Access (CDMA), Wideband CDMA (WCDMA), Time Division-Synchronous CDMA (TD-SCDMA), CDMA2000, Worldwide Interoperability for Microwave Access (WiMAX), Wireless Fidelity (Wi-Fi), $4^{th}$ Generation Long Term Evolution (LTE), LTE-Advance (LTE-A), or 5th Generation New Radio (5G NR), etc. Therefore, one skilled in the arts could readily understand that the terms used herein may also refer to their equivalents in any other infrastructure. For example, the term "User Equipment" or "UE" used herein may refer to a mobile device, a mobile terminal, a mobile station, a user device, a user terminal, a wireless device, a wireless terminal, or any other equivalents. For another example, the term "gNB" used herein may refer to a base station, a base transceiver station, an access point, a hot spot, a NodeB, an Evolved NodeB, a network element, or any other equivalents. Further, the term "network element" used herein may refer to a network function, a network entity, a node, a network equipment, or any other device on the network side. Further, please note that the term "indicator" used herein may refer to an attribute, a setting, a configuration, a profile, an identifier, a field, one or more bits/octets, or any data by which information of interest may be indicated directly or indirectly.

Further, some of the 3GPP Technical Specifications (3GPP TSs) are cited or mentioned throughout the specification, and they are incorporated herein by reference in their entireties. Please note that the present disclosure takes precedence over these incorporated TSs if there is any inconsistency or conflict therebetween.

The 5G Core Network has been designed around services that are invoked using a standard Application Programming Interface (API). On the surface, the 5G architecture looks very different from the 4G Evolved Packet Core (EPC) but on close inspection, one can see the evolution from the 4G architecture to the 5G architecture.

For example, the 5G core has evolved from the 4G EPC in two steps:
  Control and User Plane Separation (CUPS) of the 4G EPC; and
  Reorganizing the 4G EPC CUPS functions into services.

CUPS

The introduction of control and user plane separation in the 4G EPC is the first step towards the 5G architecture. The Serving GateWay (SGW) and Packet Data Network (PDN) GateWay (PGW) functions were split into a control and data plane component:
  SGW→SGW-C and SGW-U
  PGW→PGW-C and PGW-U Reorganization to Services With the separation of control and user plane functions, the split functions are reorganized into new network functions, such as Access and Mobility Function (AMF), Session Management Function (SMF), User Plane Function (UPF), etc. In general, an AMF in 5G provides most of the functions which were previously performed by a Mobility Management Entity (MME) in 4G, an SMF provides rest of the functions which were previously provided by the MME in addition to the control plane (CP) functions which were previously provided by SGW and PGW, and a UPF provides the user plane (UP) functions which were previously provided by SGW and PGW. In such a manner, the 4G EPC components have been reorganized into service-oriented functions. Therefore, any reference to a network function defined for 5G may also be applicable to a node defined for 4G or any other appropriate telecommunication technologies. For example, when "SMF" is recited in some embodiments, "PGW-C" or "SGW-C" may be equally applicable. For example, when "UPF" is recited in some embodiments, "PGW-U" or "SGW-U" may be equally applicable.

FIG. 1

FIG. 1 is an overview diagram illustrating a typical 5G New Radio (NR) network architecture 10 according to an embodiment of the present disclosure. As shown in FIG. 1, the network 10 may comprise one or more UEs 100 and a (radio) access network ((R)AN) 105, which could be a base station, a Node B, an evolved NodeB (eNB), a gNB, or any entity which provides access to the UEs 100. Further, the network 10 may comprise its core network portion comprising (but not limited to) an AMF 110, an SMF 115, a Policy Control Function (PCF) 120, an Application Function (AF) 125, a Network Slice Selection Function (NSSF) 130, an AUthentication Server Function (AUSF) 135, a Unified Data Management (UDM) 140, a Network Exposure Function (NEF) 145, a Network Repository Function (NRF) 150, and one or more UPFs 155. As shown in FIG. 1, these entities may communicate with each other via the service-based interfaces, such as, Namf, Nsmf, Npcf, etc. and/or the reference points, such as, N1, N2, N3, N6, N9, etc.

However, the present disclosure is not limited thereto. In some other embodiments, the network 10 may comprise additional network functions, less network functions, or some variants of the existing network functions shown in FIG. 1. For example, in a network with the 4G architecture, the entities which perform these functions may be different from those shown in FIG. 1. For another example, in a network with a mixed 4G/5G architecture, some of the entities may be same as those shown in FIG. 1, and others may be different. Further, the functions shown in FIG. 1 are not essential to the embodiments of the present disclosure. In other words, some of them may be missing from some embodiments of the present disclosure.

Here, some of the functions shown in FIG. 1, such as AMF 110, SMF 115, NRF 150, UPFs 155, which may be involved in the embodiments of the present disclosure will be described in detail below.

Referring to FIG. 1, the AMF 110 may provide most of the functions that the MME provides in a 4G network as mentioned above. Below please find a brief list of some of its functions:

Terminates the RAN CP interface (N2);
Non-access stratum (NAS) signaling;
NAS ciphering and integrity protection;
Mobility Management (MM) layer NAS termination;
Session Management (SM) layer NAS forwarding;
Authenticates UE;
Manages the security context;
Registration management;
Connection management;
Reachability management;
Mobility Management; and
Apply mobility related policies from PCF (e.g. mobility restrictions).

Further, the SMF 115 may provide the session management functions that are handled by the 4G MME, SGW-C, and PGW-C. Below please find a brief list of some of its functions:

Allocates IP addresses to UEs;
NAS signaling for session management (SM);
Sends QoS and policy information to RAN via the AMF;
Downlink data notification;
Select and control UPF for traffic routing;
Acts as the interface for all communication related to offered user plane services; and
Lawful intercept-control plane.

Further, the UPFs 155 is essentially a fusion of the data plane parts of the SGW and PGW, as mentioned above. In the context of the CUPS architecture: EPC SGW-U+EPC PGW-U→5G UPF.

The UPFs 155 may perform the following functions:
Packet routing and forwarding
Packet inspection and QoS handling, and the UPF may optionally integrate a Deep Packet Inspection (DPI) for packet inspection and classification;
Connecting to the Internet POP (Point of Presence), and the UPF may optionally integrate the Firewall and Network Address Translation (NAT) functions;
Mobility anchor for Intra RAT and Inter-RAT handovers;
Lawful intercept-user plane; and
Maintains and reports traffic statistics.

As shown in FIG. 1, the UPFs 155 are communicatively connected to the Data Network (DN) 160 which may be, or in turn communicatively connected to, the Internet, such that the UE 100 may finally communicate its user plane data with other devices outside the network 10, for example, via the RAN 105 and the UPFs 155.

Further, the NRF 150 is basically a service registry, which provides a service registration and discovery service to various network functions (NFs) such that the NFs can discover each other via the NRF 150. Further, the NRF 150 may maintain NF profiles and NF instances.

As mentioned above, when a UE is handed over from a source cell to a target cell with an active data connection, a data forwarding tunnel is sometimes required to be established between the source and target cells. Therefore, it is a problem for the serving SMF 115 to discover or identify a correct UPF 155 with such a data forwarding capability. This problem will be discussed in detail with reference to FIG. 2 below.

Further, Network Instances (NIs) are used to define on the UPFs 155 to specify different routing domains for different User Plane interfaces, e.g. network instance for access (e.g. N3) for connectivity to the RAN nodes, network interface for Core (e.g. N9) for connectivity to other Core Network hops.

In different scenarios for UE mobility with indirect data forwarding, a data path may go through multiple routing domains, for example:

source RAN→ Source-UPF or S-UPF→ target RAN
source RAN→ Target-UPF or T-UPF→ target RAN
source RAN→ S-UPF→ T-UPF→ target RAN
source RAN→ S-UPF→ T-SGW-u→target RAN
source RAN→ S-SGW-u→T-UPF→target RAN To overcome these complexity, specific routing domain for data forwarding purpose (which is focusing more on connectivity than traffic loads, as traffic for data forwarding is rather small compare to normal traffic flow). In this case, these specific network instance(s) for data forwarding should be configured in the UPF, and the SMF should indicate a correct network instance when allocating Tunnel Endpoints for data forwarding via N4. Currently it is not possible because the SMF cannot get the information on which network instance to be used for data forwarding in the UPF.

FIG. 2

Figure 2:
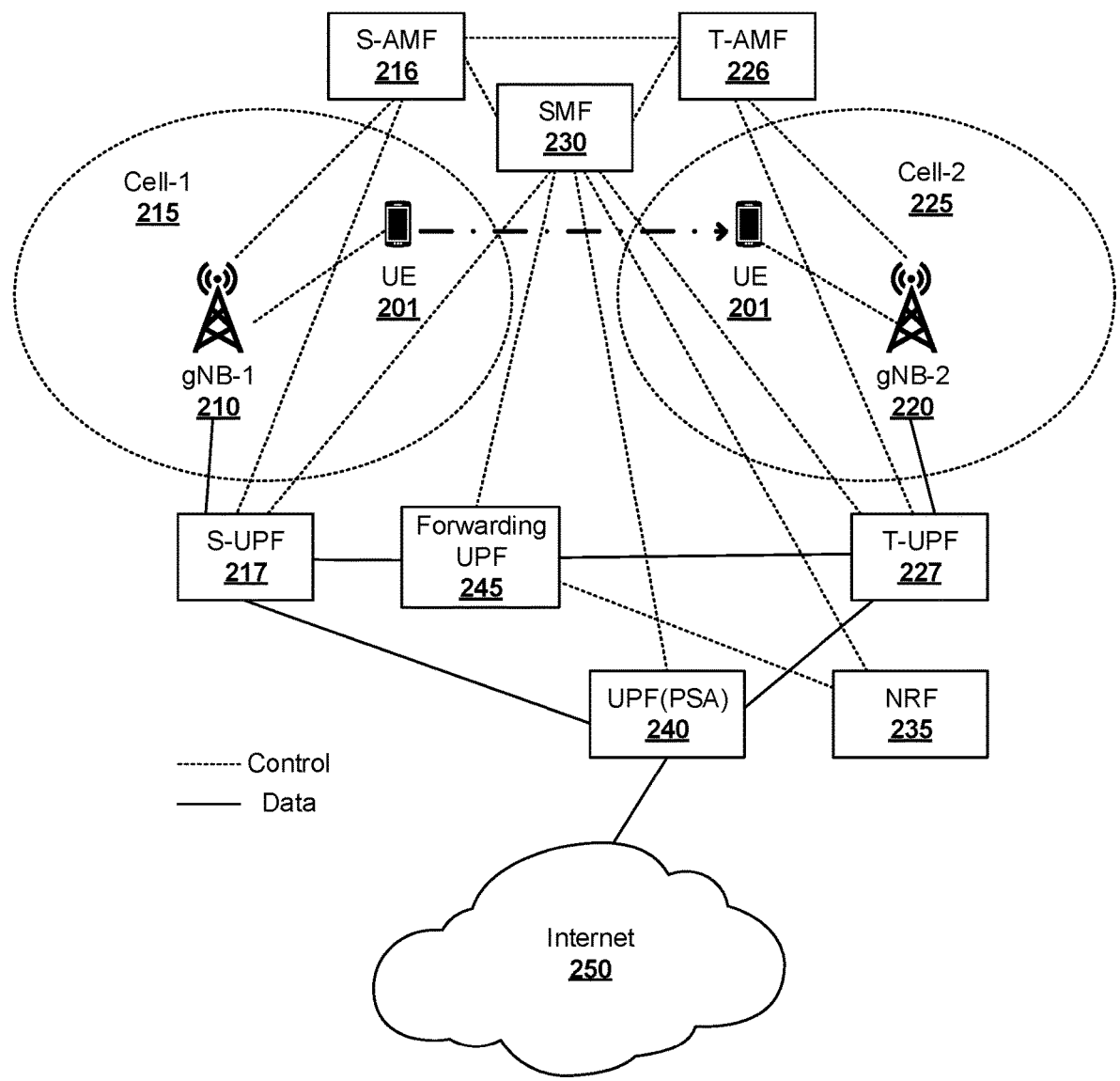
FIG. 2 is a diagram illustrating a telecommunication system to which a method for data forwarding according to an embodiment of the present disclosure is applicable.

FIG. 2 is a diagram illustrating a telecommunication system 200 to which a method for data forwarding according to an embodiment of the present disclosure is applicable. As shown in FIG. 2, the telecommunication system 200 may comprise a UE 201 and its source serving access node, gNB-1 (or S-NG-RAN) 210, which provides access to the UE 201 in its serving cell, Cell-1 215, before the UE 201 moves out of the Cell-1 215. Further, the telecommunication system 200 may further comprise a target serving access node, gNB-2 (or T-NG-RAN) 220, which will provide access to the UE 201 in its serving cell, Cell-2 225, after the UE 201 moves into the Cell-2 225. In other words, when the UE-1 201 moves from the source Cell-1 215 to the target Cell-2 225, a handover procedure is performed for the UE-1 201 at various nodes shown in FIG. 2.

Referring to FIG. 2, the telecommunications system 200 may further comprise one or more UPFs, for example, an S-UPF 217, a T-UPF 227, and a UPF (PDU Session Anchor, or PSA) 240, via which the UE 201 may communicate its user plane data with the Internet 295. To be specific, the S-UPF 217 is a serving UPF for the UE 201 while the UE 201 is served by the gNB-1 210, and the T-UPF 227 is a serving UPF for the UE 201 while the UE 201 is served by the gNB-2 220. Further, the UPF (PSA) is an anchor UPF which terminates the N6 interface of a PDU session for the UE 201 within in the core network shown in FIG. 2. Further, the telecommunications system 200 may comprise one or more forwarding UPFs, which may be dedicated for data forwarding between cells, such as a forwarding UPF 245 for data forwarding between the Cell-1 215 and the Cell-2 225.

Furthermore, there could be one or more other UPFs in the telecommunications network 20, for example, one or more UPFs between the UPF (PSA) 240 and the Internet 250 and/or between the UPF (PSA) 240 and the S-UPF 217/T-UPF 227, or more than one forwarding UPFs 245, or the like. Therefore, the present disclosure is not limited to the embodiment shown in FIG. 2 in this regard.

Referring to FIG. 2 again, the telecommunications system 200 may further comprise an S-AMF or Source-AMF 216, a T-AMF or Target-AMF 226, an SMF 230, and an NRF 235. Further, some of the components are omitted from FIG.

2 for simplicity, for example, a PCF, an AF, an NSSF, etc., as those shown in FIG. 1, since they are not directly involved in the embodiments of the present disclosure.

Please note that this deployment is only for the purpose of illustration rather than limiting of the present disclosure. In some other embodiments, the telecommunications system 200 may comprise more UEs, gNBs, UPFs, AMFs, SMFs, and/or NRFs, or may have different configurations thereof and/or different connections therebetween.

As shown in FIG. 2, when the UE 201 moves from the Cell-1 215 to the Cell-2 225, a handover procedure is triggered. According to the subclause 4.9.1.3, 3GPP TS 23.502, V16.4.0, an inter NG-RAN node N2 based handover procedure may be initiated. Next, a detailed description of the handover procedure will be given with reference to FIG. 2, FIG. 3A, and FIG. 3B.

Figure 3A:
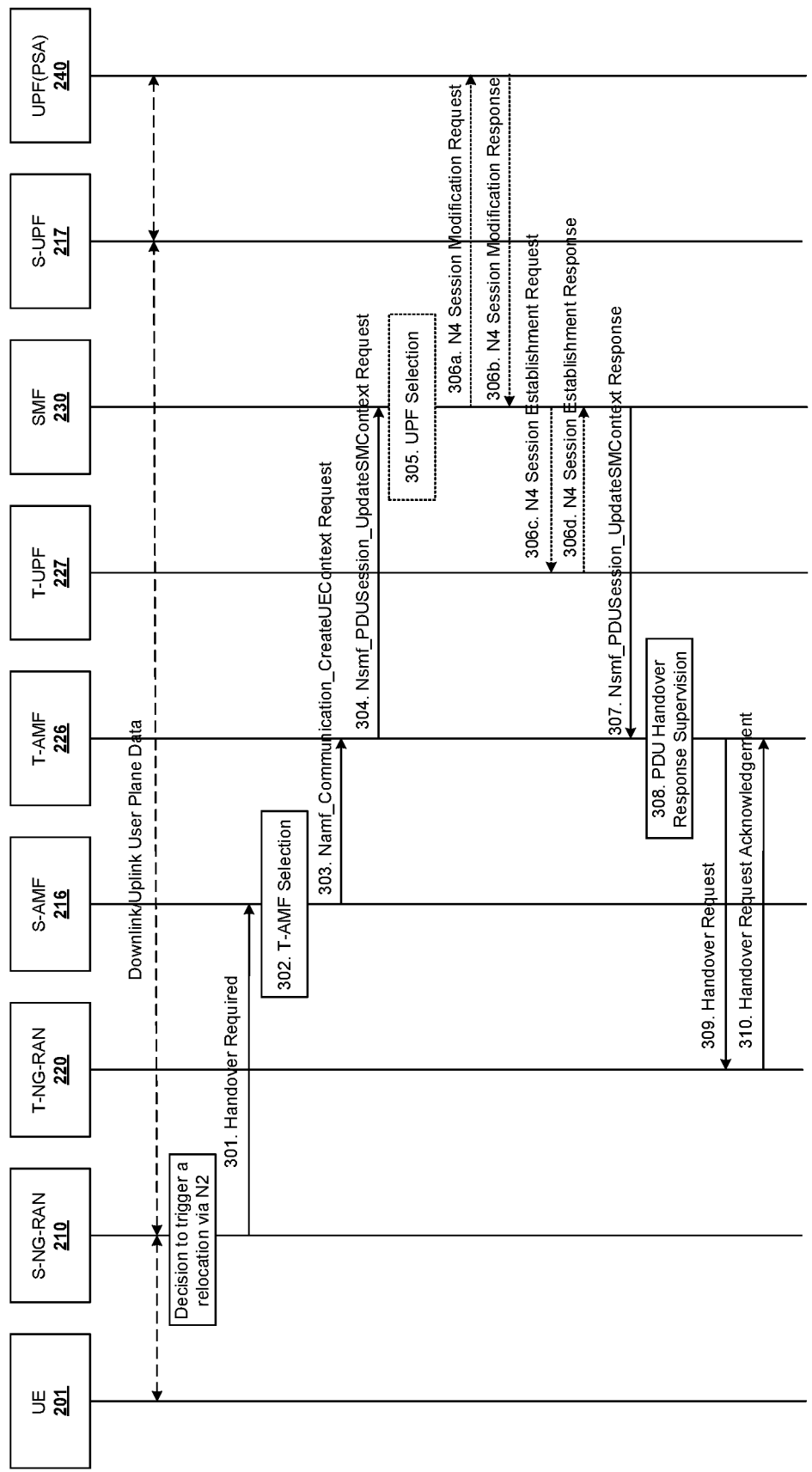
FIGS. 3A and 3B are message flow diagrams illustrating exemplary messages exchanged between different nodes for facilitating data forwarding according to an embodiment of the present disclosure.
Figure 3B:
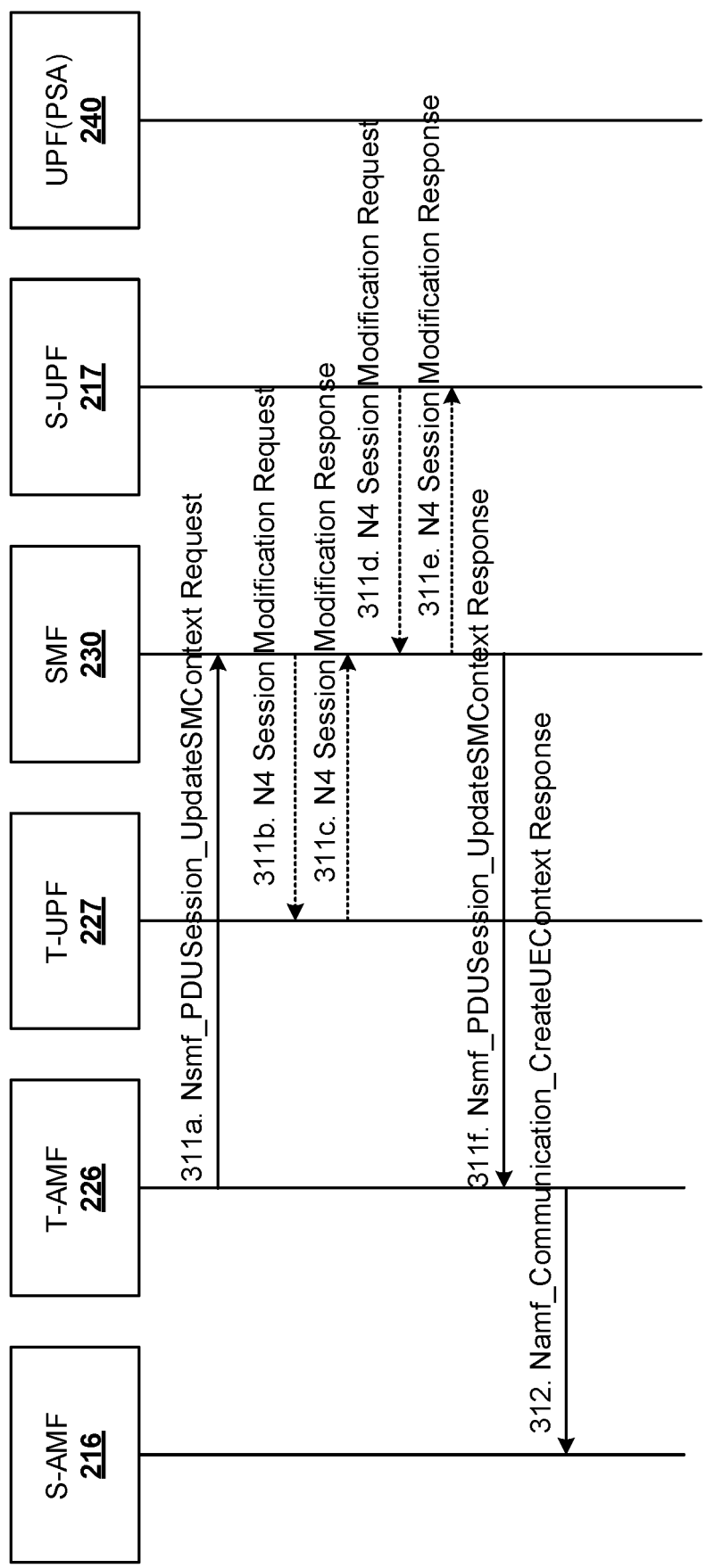

FIGS. 3A and 3B

FIGS. 3A and 3B are message flow diagrams illustrating exemplary messages exchanged between different nodes for facilitating data forwarding according to an embodiment of the present disclosure. Please note that some nodes shown in FIG. 3A, such as the UE 201, the S-NG-RAN 210, the T-NG-RAN 220 are omitted from FIG. 3B since they are not directly related to the steps shown in FIG. 3B.

As shown in FIG. 2 and FIG. 3A, UE 201 may communicate its downlink/uplink user plane data with the Internet 250, for example, via S-NG-RAN (or gNB-1) 210, S-UPF 217, and UPF (PSA) 240 before the handover procedure is triggered.

Referring to FIG. 3A, the source NG-RAN 210 may decide to initiate an N2-based handover of the UE 201 to the target NG-RAN 220. This can be triggered, for example, due to new radio conditions or load balancing, if there is no Xn connectivity to the target NG-RAN 220, an error indication from the target NG-RAN 220 after an unsuccessful Xn-based handover (i.e. no IP connectivity between the T-RAN 220 and the S-UPF 217), or based on dynamic information learnt by the S-RAN 210.

The availability of a direct forwarding path may be determined in the source NG-RAN 210 and indicated to the SMFs (e.g. the serving SMF 230). If IP connectivity is available between the source and target NG-RANs 210 and 220 and security association(s) is in place between them, a direct forwarding path is available. However, if a direct forwarding path is not available, indirect forwarding may be used, for example, as shown in FIG. 2. The SMF 230 may use the indication from the source NG-RAN 210 to determine whether to apply indirect forwarding.

As shown in FIG. 3A, at step S301, the S-RAN 210 may transmit to the S-AMF 216 a Handover Required message to indicate its desire of handover of the UE 201. All PDU Sessions of the UE 201 handled by the S-RAN 210 (i.e. all existing PDU Sessions with active UP connections) may be included in the Handover Required message, indicating which of those PDU Session(s) are requested by the S-RAN 210 to handover.

Further, in some embodiments, Direct Forwarding Path Availability included in the Handover Required message may indicate whether direct forwarding is available from the S-RAN 210 to the T-RAN 220. This indication from the S-RAN 210 can be based on e.g. the presence of IP connectivity and security association(s) between the S-RAN 210 and the T-RAN 220 as mentioned above. In the embodiment shown in FIG. 2, the indication indicates that the direct data forwarding is not available.

At step S302, the S-AMF 216 may select a T-AMF (e.g. the T-AMF 226) for the UE 201 and the target RAN 220. To be specific, when the S-AMF 216 cannot serve the UE 201 anymore, the S-AMF 216 may select the T-AMF 226.

At step S303, the S-AMF 216 may transmit to the T-AMF 226 an Namf_Communication_CreateUEContext Request message to request the T-AMF 226 to create a UE context for the UE 201.

At step S304, upon receipt of the Namf_Communication_CreateUEContext Request message, the T-AMF 226 may transmit to the serving SMF 230 an Nsmf_PDUSession_UpdateSMContext Request message. For each PDU Session indicated by the S-RAN 210, the T-AMF 226 may invoke an Nsmf_PDUSession_UpdateSMContext Request to the associated SMF 230. However, if the S-NSSAI associated with PDU Session is not available in the T-AMF 226, the T-AMF 226 does not invoke Nsmf_PDUSession_UpdateSMContext for this PDU Session.

At step S305, based on the information comprised in the received Nsmf_PDUSession_UpdateSMContext Request, the SMF 230 may check if N2 Handover for the indicated PDU Session of the UE 201 can be accepted or not. Further, the SMF 230 may check also the UPF Selection Criteria. If the UE 201 has moved out of the service area of the UPF connecting to NG-RAN, the SMF 230 may select a new intermediate UPF. If redundant transmission is performed for one or more Quality of Service (QoS) Flows of the PDU Session, the SMF 230 may select two new Intermediate UPFs to support the redundant transmission based on two N3 and N9 tunnels between the T-RAN 220 and the UPF (PSA) 240. In this case, the step S306c and S306d are performed between the SMF 230 and each T-UPF 227.

At step S306a, the SMF 230 may transmit to the UPF (PSA) 240 an N4 Session Modification Request message. If the SMF 230 selects a new UPF to act as intermediate UPF for the PDU Session, and the different CN Tunnel Info need be used, the SMF 230 may send the N4 Session Modification Request message to the UPF (PSA) 240.

At step S306b, the UPF (PSA) 240 may transmit to the SMF 230 an N4 Session Modification Response message. If the UPF (PSA) 240 allocates CN Tunnel Info (on N9) of UPF (PSA) 240, it may provide CN Tunnel Info (on N9) to the SMF 230.

At step S306c, the SMF 230 may transmit to the T-UPF 227 an N4 Session Establishment Request message. The N4 Session Establishment Request message is sent to the T-UPF 227 to provide Packet detection, enforcement and reporting rules to be installed on the T-UPF 227. The CN Tunnel Info (on N9) of UPF (PSA) 240 for this PDU Session, which is used to set up N9 tunnel, is also provided to the T-UPF 227.

At step S306d, the T-UPF 227 may transmit to the SMF 230 an N4 Session Establishment Response message with DL CN Tunnel Info and UL CN Tunnel Info.

At step S307, the SMF 230 may transmit to the T-AMF 226 an Nsmf_PDUSession_UpdateSMContext Response message to indicate the SMF 230 has updated its SMContext for the indicated PDU session and is ready for the handover of the UE 201.

At step S308, the T-AMF 226 may supervise the Nsmf_PDUSession_UpdateSMContext Response message from the SMF 230. When the Nsmf_PDUSession_UpdateSMContext Response message is received, the T-AMF 226 may continue with the N2 Handover procedure.

At step S309, the T-AMF 226 may transmit to the T-RAN 220 a Handover Request message to instruct the T-RAN 220 to prepare for a handover of the UE 201.

At step S310, the T-RAN 220 may transmit to the T-AMF 226 a Handover Request Acknowledge message to acknowledge the handover request.

At step S311a shown in FIG. 3B, the T-AMF 226 may transmit to the SMF 230 an Nsmf_PDUSession_UpdateSM-Context Request message. For each N2 SM response received from the T-RAN 220 (i.e. N2 SM information included in Handover Request Acknowledge), the T-AMF 226 may send the received N2 SM response to the SMF 230.

At step S311b, the SMF 230 may transmit to the T-UPF 227 an N4 Session Modification Request message which may comprise indication to allocate DL forwarding tunnel(s) for indirect forwarding. To be specific, the SMF 230 may update the T-UPF 227 by providing the T-RAN SM N3 forwarding information list by sending a N4 Session Modification Request to the T-UPF 227.

If indirect forwarding applies based on indication from the S-RAN 210 and the UPF is re-allocated and if the SMF 230 decides to setup the indirect forwarding tunnel on the same T-UPF 227, the SMF 230 may also request in the N4 Session Modification Request message to the T-UPF 227, to allocate DL forwarding tunnel(s) for indirect forwarding.

Indirect forwarding may be performed via a UPF which is different from the S-UPF 217 and the T-UPF 227. In such a case, the SMF 230 may select a Forwarding UPF 245 shown in FIG. 2 for indirect forwarding. To be specific, the forwarding UPF 245 is a different UPF than the S-UPF 217 and the T-UPF 227, and it may relay the data for the UE 201 from the S-NG-RAN 210 to the T-NG-RAN 220 with the help of S-UPF 217 and the T-UPF 227. The description of the register & discovery procedures for the forwarding UPF 245 will be explained in detail with reference to FIG. 4A and FIG. 4B.

Nevertheless, the SMF 230 may determine or identify one or more forwarding UPFs 245 for indirect forwarding and inform the T-UPF 227 of information related to the UPFs 245.

At step S311c, the T-UPF 227 may transmit to the SMF 230 an N4 Session Modification Response message to indicate its DL forwarding information and/or its awareness of the forwarding UPF 245.

At step S311d, the SMF 230 may transmit to the S-UPF 217 an N4 Session Modification Request message to inform the S-UPF 217 of the information of the forwarding UPF 245. In other words, the SMF 230 may indicate in the N4 Session Modification Request message to the S-UPF 217 to allocate DL forwarding tunnel(s) for indirect forwarding. Indirect forwarding may be performed via the forwarding UPF 245 which is different from the S-UPF 217 and the T-UPF 227.

At step S311e, the S-UPF 217 may transmit to the SMF 230 an N4 Session Modification Response message indicate its DL forwarding information and/or its awareness of the forwarding UPF 245.

At step S311f, the SMF 230 may transmit to the T-AMF 226 an Nsmf_PDUSession_UpdateSMContext Response message. The SMF 230 may include the T-UPF 227 and/or S-UPF 217's DL forwarding information containing the N3 UP address and the DL Tunnel ID of the UPFs.

At step S312, the T-AMF 226 may transmit to the S-AMF 216 an Namf_Communication_CreateUEContext Response message. The T-AMF 226 may supervise the Nsmf_PDUSession_UpdateSMContext Response message from the SMF 230 and send the Namf_Communication_CreateUEContext Response message to the S-AMF 216.

After that, an execution phase of the handover procedure may be performed as provisioned in Subclause 4.9.1.3.3 of 3GPP TS 23.502, V16.4.0.

As shown in FIG. 2, FIG. 3A, and FIG. 3B, a handover procedure with indirect forwarding via the forwarding UPF 245 may be accomplished, and the data, which is destined to the UE 201 but sent to the S-UPF 217 during the handover procedure may be transferred via the forwarding UPF 245 to the T-UPF 227, the gNB-2 220, and finally to the UE 201 once the UE 201 is handed over to and served by the Cell-2 225.

Next, the register & discovery procedures for the forwarding UPF 245 may be described in detail with reference to FIG. 4A and FIG. 4B.

Figure 4A:
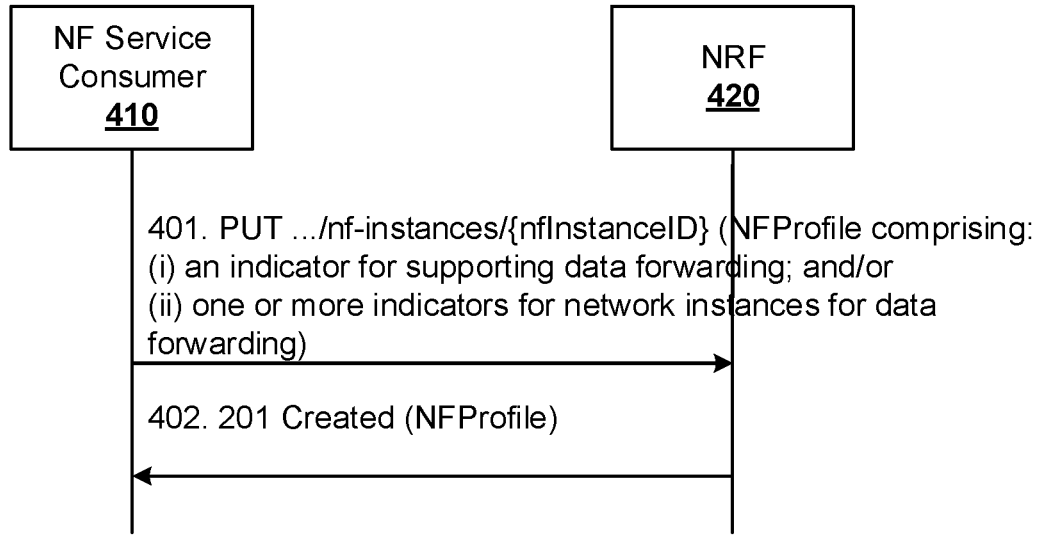
FIGS. 4A and 4B are message flow diagrams illustrating exemplary messages exchanged between different nodes for facilitating data forwarding according to another embodiment of the present disclosure.
Figure 4B:
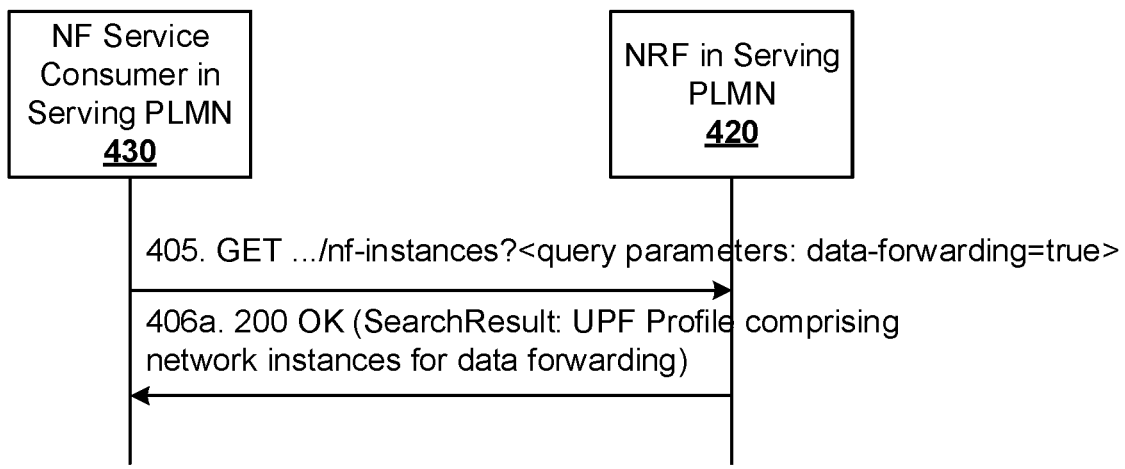

FIGS. 4A and 4B

FIGS. 4A and 4B are message flow diagrams illustrating exemplary messages exchanged between different nodes for facilitating data forwarding according to another embodiment of the present disclosure. During a register & discovery procedure, three parties are typically involved, that is, a service producer, a service consumer, and a service registry or repository. As used herein, a service producer is responsible for providing a certain service which is to be consumed by a service consumer, and a service registry is responsible to maintain the information of the service producer and help the service consumer to discover the service producer. Please note that a service producer for a first service may also be a service consumer and/or service registry for a second service, or vice versa. For example, as shown in FIG. 4A, the NRF 420 acts as a service registry or repository, while it is also a service producer with respect to its service-registering service and service-discovery service. For another example, an NF service producer, such as a UPF which provides data forwarding service (or function or capability), may also a service consumer due to the use of the service-registering service offered by the NRF 420. For yet another example, an NF service consumer as shown in FIG. 4B, such as an SMF which needs the data forwarding service (or function or capability) offered by the UPF, may also a service consumer due to the use of the service-discovering service offered by the NRF 420.

Referring back to FIG. 4A and with reference to FIG. 2, the NF service consumer 410 (e.g., the forwarding UPF 245 shown in FIG. 2, which is a consumer of the service-registering service provided by the NRF 420) may register its data forwarding service or function with the NRF 420 (e.g. the NRF 235 shown in FIG. 2), for example, via a "NFRegister" or "NFUpdate" procedure or a request/response message for Nnrf_NFManagement service similar to that defined in Subclause 5.2, 3GPP TS 29.510, V16.3.0. Further, in some other embodiments, the NF Service Consumer 410 may not be the UPF itself, but another network function or node which registers the UPF's data forwarding function on behalf of the UPF. In some embodiments, the NF Service Consumer 410 may be an Operation & Maintenance entity/node/unit or even a human user who manually modifies the NRF 420's local configuration.

To be specific, at step S401, the UPF 410 may send a Hyper Text Transfer Protocol (HTTP) PUT request to the NRF 420. As shown in FIG. 4A, the PUT message may comprise (i) an indicator indicating that the UPF 410 provides a data forwarding service or has a data forwarding function; and/or (ii) one or more indicators indicating the network instances for data forwarding. On success at step S402, an HTTP "201 Created" response message may be returned.

In this way, the NRF 420 may be informed of the data forwarding capability of the UPF 410, and this information may be maintained at the NRF 420 and discovered by another NF, for example, as shown in FIG. 4B.

Referring to FIG. 4B and with reference to FIG. 2, the NF service consumer 430 (e.g., the SMF 230 shown in FIG. 2, which is a consumer of the service-discovering service provided by the NRF 420) may discover NFs providing a data forwarding service with the help from the NRF 420 (e.g. the NRF 235 shown in FIG. 2), for example, via a "NFDiscover" procedure or a request/response message for Nnrf_NFDiscovery service similar to that defined in Subclause 5.3, 3GPP TS 29.510, V16.3.0.

To be specific, the SMF 230 may send an HTTP GET request to the NRF 420 at step S405. The input filter criteria for the discovery request may be included in query parameters, for example, "<query parameters: data-forwarding=true>" which indicates that the SMF 230 tries to find a UPF having a data forwarding function.

At step S406, on success, an HTTP "200 OK" response message may be returned. The response body may contain a validity period, during which the search result can be cached by the SMF 230, and an array of NF Profile objects, that satisfy the search filter criteria (e.g., all NF Instances offering a data forwarding service).

Although some exemplary procedures for service register & discovery are shown in FIG. 4A and FIG. 4B, the present disclosure is not limited thereto. For example, some other function register & discovery procedures may be described with reference to FIGS. 5A and 5B.

Figure 5A:
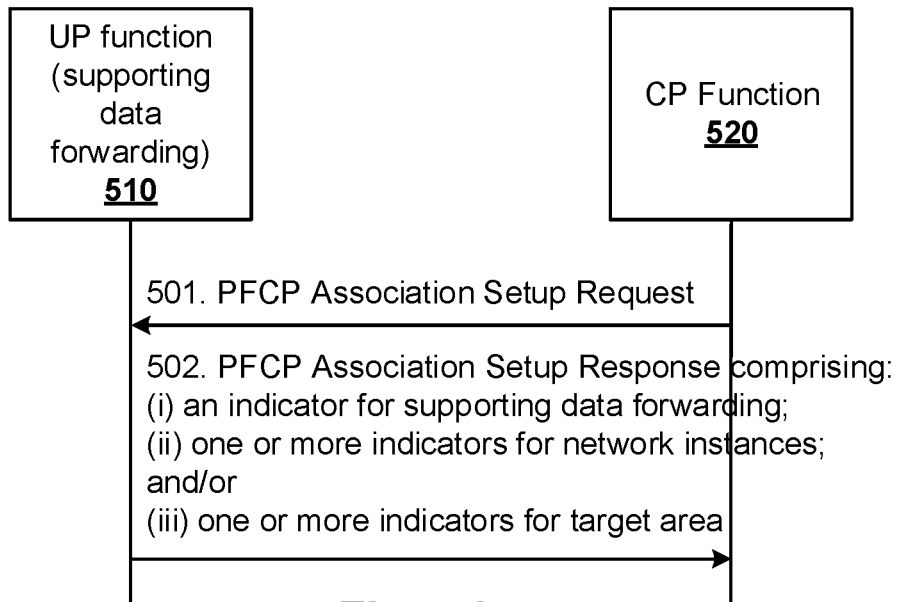
FIGS. 5A and 5B are message flow diagrams illustrating exemplary messages exchanged between different nodes for facilitating data forwarding according to yet another embodiment of the present disclosure.
Figure 5B:
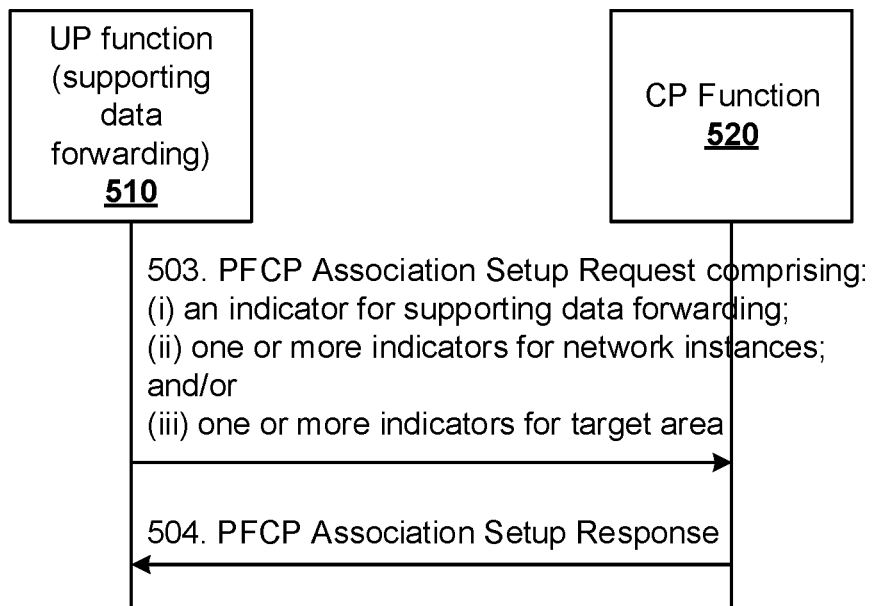

FIGS. 5A and 5B

FIGS. 5A and 5B are message flow diagrams illustrating exemplary messages exchanged between different nodes for facilitating data forwarding according to yet another embodiment of the present disclosure.

Referring to FIG. 5A and with reference to FIG. 2, a UP function 510 (e.g., the forwarding UPF 245 shown in FIG. 2) may inform its data forwarding service or function to a CP function 520 (e.g. the SMF 230 or the NRF 235 shown in FIG. 2), for example, via a procedure similar to that defined in Subclause 6.2.6/6.2.7, 3GPP TS 29.244, V16.3.1.

To be specific, at step S501, the UP function 510 may receive a Packet Forwarding Control Plane (PFCP) Association Setup Request message from the CP function 520 to setup a PFCP association therebetween, to enable the CP function 520 to use the resources of the UP function 510 subsequently.

At step S502, upon receipt of the PFCP Association Setup Request message, the UP function 510 may respond with a PFCP Association Setup Response message comprising: (i) an indicator indicating that the UP function 510 provides a data forwarding service or has a data forwarding function; (ii) one or more indicators indicating the network instances for data forwarding; and (iii) one or more indicators indicating a target area towards which IP connectivity is enabled by at least one of the network instances indicated in (ii). In some embodiments, the target area may be represented by a list of Tracking Area Identities (TAIs), a list of NG-RAN-ids, or a list of eNB-ids.

In this way, the CP function 520 may be informed of the data forwarding capability of the UP function 510, and this information may be used during the selection of UPF at the CP function 230.

FIG. 5B shows a similar procedure as that shown in FIG. 5A with the difference that this procedure is initiated by the UP function 510 rather than the CP function 520. To be specific, at step S503, the UP function 510 may transmit a Packet Forwarding Control Plane (PFCP) Association Setup Request message to the CP function 520 to setup a PFCP association therebetween, to enable the CP function 520 to use the resources of the UP function 510 subsequently. The PFCP Association Setup Request message may comprise: (i) an indicator indicating that the UP function 510 provides a data forwarding service or has a data forwarding function; (ii) one or more indicators indicating the network instances for data forwarding; and (iii) one or more indicators indicating a target area towards which IP connectivity is enabled by at least one of the network instances indicated in (ii). In some embodiments, the target area may be represented by a list of Tracking Area Identities (TAIs), a list of NG-RAN-ids, or a list of eNB-ids.

At step S504, upon receipt of the PFCP Association Setup Request message, the CP function 520 may respond with a PFCP Association Setup Response message to acknowledge the awareness of the data forwarding capability of the UP function 510.

In such a way, an SMF or NRF may be informed of the data forwarding capability of a UPF, and subsequent operations may be performed accordingly.

Further, a proposed change of 3GPP TS 29.244 may be as follows:

7.4.4.1 PFCP Association Setup Request 7.4.4.1.1 General

TABLE 7.4.4.1-1

| Information elements | P | Condition/Comment | IE Type |
|---|---|---|---|
| Information Elements in a PFCP Association Setup Request ||||
| Node ID | M | This IE shall contain the unique identifier of the sending Node. | Node ID |
| Recovery Time Stamp | M | This IE shall contain the time stamp when the CP or UP function was started, see clause 19A of 3GPP TS 23.007 [24]. (NOTE) | Recovery Time Stamp |
| UP Function Features | C | This IE shall be present if the UP function sends this message and the UP function supports at least one UP feature defined in this IE. When present, this IE shall indicate the features the UP function supports. | UP Function Features |
| CP Function Features | C | This IE shall be present if the CP function sends this message and the CP function supports at least one CP feature defined in this IE. When present, this IE shall indicate the features the CP function supports. | CP Function Features |

TABLE 7.4.4.1-1-continued

Information Elements in a PFCP Association Setup Request

| Information elements | P | Condition/Comment | IE Type |
|---|---|---|---|
| Alternative SMF IP Address | O | This IE may be present if the SMF advertises the support of the SSET and/or MPAS feature in the CP Function Features IE (see clause 8.2.58). When present, this IE shall contain an IPv4 and/or IPv6 address of an alternative SMF or an alternative PFCP entity in the same SMF when SSET feature is used, or an alternative PFCP entity in the same SMF when MPAS feature is used. Several IEs with the same IE type may be present to represent multiple alternative SMF IP addresses. | Alternative SMF IP Address |
| SMF Set ID | C | This IE shall be present if the SMF advertises the support of the MPAS feature in the CP Function Features IE (see clause 5.22.3). When present, this IE shall contain an FQDN representing the SMF set to which the SMF belongs. | SMF Set ID |
| PFCP Session Retention Information | O | This IE may be present to request the UP function to keep all or part of the existing PFCP sessions upon receipt of a PFCP association setup request with a Node ID for which a PFCP association was already established. See clause 6.2.6.2.1. | PFCP Session Retention Information |
| UE IP address Pool Information | O | This IE may be present when the UP function sends this message, if UE IP Address Pools are configured in the UP function. Several IE with the same IE type may be present to represent multiple UE IP address Pool Information. | UE IP address Pool Information |
| GTP-U Path QoS Control Information | C | This IE may be present, if the CP function sends this message, to request the UPF to monitor the QoS on GTP-U paths (see clause 5.24.5). Several IEs with the same IE type may be present to represent multiple GTP-U paths (with different parameters) to monitor. | GTP-U Path QoS Control Information |
| Clock Drift Control Information | O | This IE may be present, if the CP function sends this message, to request the UPF to report clock drift between the TSN time and 5GS time for TSN working domains (see clause 5.26.4). Several IEs with the same IE type may be present for multiple TSN Time domains (with different parameters). | Clock Drift Control Information |
| UPF Instance ID | O | This IE may be present if the UP function is a 5G UPF and if available, and if the message is sent by the UPF. | NF Instance ID |
| Data Forwarding Information | O | This IE shall be present if the UP function has indicated it supports data forwarding. Several IEs with the same IE type may be present for different data forwarding information which enables IP connectivity to different target areas. | Data Forwarding Information |

NOTE:
A PFCP function shall ignore the Recovery Timestamp received in the PFCP Association Setup Request message.

TABLE 7.4.4.1-x

Data Forwarding Information within PFCP Association Setup Response message

Octet 1 and 2
Data Forwarding Information IE Type = xxx (decimal)
Octets 3 and 4
Length = n

| Information elements | P | Condition/Comment | Appl. Sx a | Appl. Sx b | Appl. Sx c | N4 | IE Type |
|---|---|---|---|---|---|---|---|
| Network Instance | M | | X | — | — | X | Network Instance |
| Target Area Information | O | The IE may be present to indicate the target area information (e.g. a list of TAIs, NG-RAN ids) towards which the IP connectivity that the Network Instance enables. | — | X | — | X | Target Area Information |

Further, although FIG. 5A and FIG. 5B show an improved PFCP Association Setup procedure, some other procedures may also be used. For example, in some embodiments, a similarly improved PFCP Association Update procedure may also be applicable to inform an SMF or NRF of the data forwarding capability of a UPF. The present disclosure is not limited thereto.

Furthermore, although the embodiments described above are given in the context of 5G terminologies, similar issues may be present for a 4G LTE network, or more specific, Evolved Packet Core (EPC) network as well. Therefore, an enhanced DNS procedure is also proposed to enable the MME (to find a forwarding SGW or SGW-C) and the SGW-C (to find a SGW-U) to use enhanced DNS Records for SGW-C and SGW-U, respectively, with new application protocol, or new network capability corresponding to the data forwarding.

First, an SGW-C and/or an SGW-U being configured for data forwarding may be provisioned with a DNS NAPTR record under a target area, e.g. a TAI FQDN or eNode-ID FQDN, in the DNS server, for example, similarly to that defined in Subclause 5.2.1, 3GPP TS 29.303, V16.2.0.

In some embodiments, the (forwarding) SGW-C NAPTR DNS record may be enhanced with provisioning a new app-protocol, e.g. x-sgwforwarding, for the existing app-service, x-3gpp-sgw; or as a new Network Capability (e.g., named "sgwforwarding" or "sf"), where an existing app-protocol may be appended with "+nc-sgwforwarding", e.g. "x-3gpp-sgw:x-s5-gtp+nc-sgwforwarding". Please note that the names are only exemplary and the present disclosure is not limited thereto.

Similarly, the (forwarding) SGW-U NAPTR DNS record may be enhanced with provisioning a new app-protocol, e.g. x-sgwforwarding, for the existing app-service, x-3gpp-upf; or as a new Network Capability (e.g. named "sgwforwarding" or "sf"), where an existing app-protocol may be appended with "+nc-sgwforwarding", e.g. "x-3gpp-upf:x-sxa+nc-sgwforwarding". The "+nc-sgwforwarding" can be appended further with the corresponding network instance. e.g. "x-3gpp-upf:x-sgwforwarding+nc-networkinstance" or "x-3gpp-upf:x-sxa+nc-sgwforwarding.networkinstance". The symbol "." between sgwforwarding and network instance is delimiter.

Next, an MME may start an S-NAPTR procedure with an Application Unique String which set to target area FQDN, e.g. TAI FQDN or eNode-ID FQDN, and desired services x-3gpp-sgw:x-sgwforwarding, x-3gpp-sgw:x-s5-gtp (if new app-protocol is used) or x-3gpp-sgw:x-s5-gtp+nc-sgwforwarding (when sgwforwarding is defined as a network capability in the DNS).

Similarly, the SGW-C may start an S-NAPTR procedure with an Application Unique String which set to target area FQDN, e.g. TAI FQDN or eNode-ID FQDN, and desired services x-3gpp-upf:x-sgwforwarding or x-3gpp-upf:x-sxa+nc-sgwforwarding.

Therefore, the MME or SGW-C may discover the SGW-U which provides a data forwarding function with the help of the DNS server.

Further, in some embodiments, additional information (e.g. Tracking Area or SMF Serving Area) might be provided by UPF together with the indication, indicating the serving area which is capable performing the data forwarding as part of UpfInfo, for example. Further, in some embodiments, additional information (e.g. Tracking Area or SMF serving area) might be provided by the UPF per network instance, to help SMF to identify which network instance to be used based on e.g. UE location. Further, in some embodiments, certain additional information might be provided by the AMF to the SMF, e.g. when perform PDU Session modification during handover or idle mobility.

Further, in the above embodiments, a UPF may register its own service at an NRF. The present disclosure is not limited thereto. In some other embodiments where the UPF itself may not support Service Registration to register its support of data forwarding, such registration at the NRF may be performed via Operation & Management, or may be performed via local configuration.

FIG. 6

Figure 6:
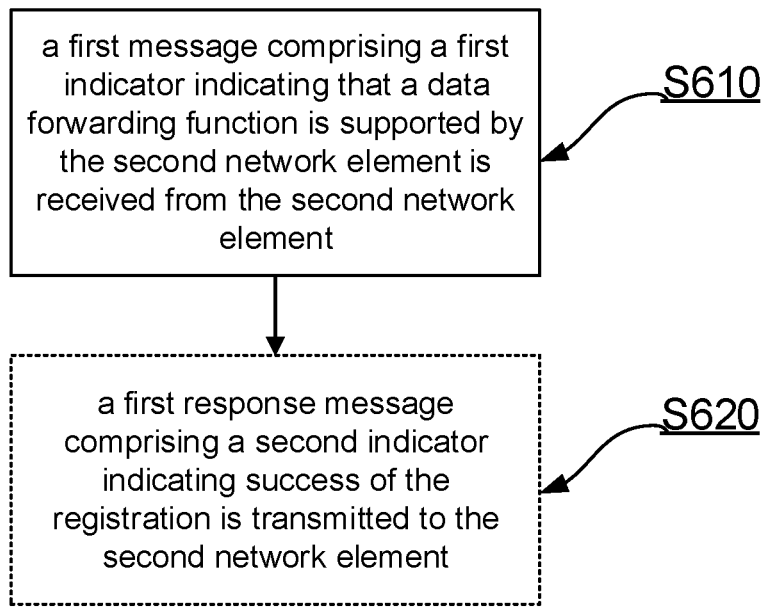
FIG. 6 is a flow chart illustrating an exemplary method at a first network element for facilitating data forwarding according to an embodiment of the present disclosure.

FIG. 6 is a flow chart of an exemplary method 600 for facilitating data forwarding according to an embodiment of the present disclosure. The method 600 may be performed at a first network element (e.g. the NRF 150 shown in FIG. 1, the NRF 235 shown in FIG. 2, the NRF 420 shown in FIG. 4A and FIG. 4B, the CP function 520 shown in FIG. 5A and FIG. 5B, or the network element 900 shown in FIG. 9) for facilitating data forwarding. The method 600 may comprise step S610 and an optional Step S620. However, the present disclosure is not limited thereto. In some other embodiments, the method 600 may comprise more steps, less steps, different steps or any combination thereof. Further the steps of the method 600 may be performed in a different order than that described herein. Further, in some embodiments, a step in the method 600 may be split into multiple sub-steps and performed by different entities, and/or multiple steps in the method 600 may be combined into a single step.

The method 600 may begin at step S610 where a first message comprising a first indicator indicating that a data forwarding function is supported by the second network element is received from a second network element. In some embodiments, the first message may be a first request message which requests registering, at the first network element, one or more functions of the second network element comprising the data forwarding function.

At step S620, a first response message comprising a second indicator indicating success of the registration may be transmitted to the second network element.

In some embodiments, the first network element may be a Network Repository Function (NRF), and the second network element may be a User Plane Function (UPF) or Serving GateWay for User plane (SGW-U). In some embodiments, the first request message may be a request message for Nnrf_NFManagement service, and the first response message may be a response message for Nnrf_NFManagement service. In some embodiments, the first indicator may be an attribute of the data type "UpfInfo" comprised in the first request message.

In some embodiments, the method 600 may further comprise: receiving, from a third network element, a second request message comprising a third indicator indicating a query for network elements having the data forwarding function. In some embodiments, the method may further comprise: transmitting, to the third network element, a second response message comprising a list of one or more fourth indicators, each of the one or more fourth indicators indicating a network element having the data forwarding function. In some embodiments, the second network element may be one of the one or more network elements indicated by the one or more fourth indicators. In some embodiments, the third network element may be a Session Management Function (SMF), a Mobility Management Entity (MME), or a SGW for Control plane (SGW-C). In some embodiments, the second request message may be a request message for Nnrf_NFDiscovery service, and the second response message may be a response message for Nnrf_NFDiscovery service. In some embodiments, the third indicator may be a Uniform Resource Indicator (URI) query parameter comprised in the second request message. In some embodiments, the first message may comprise one or more fifth indicators indicating one or more network instances supported by the second network element for data forwarding. In some embodiments, for each of the one or more network elements indicated by the one or more fourth indicators, the second response message may comprise one or more fifth indicators indicating one or more network instances supported by the corresponding network element for data forwarding. In some embodiments, each of the fifth indicators may be an attribute of the data type "UpfInfo" comprised in the first request message or in the second response message.

In some embodiments, the first message may be one of: a Packet Forwarding Control Plane (PFCP) Association Setup Request message; a PFCP Association Update Request message; a PFCP Association Setup Response message in response to a PFCP Association Setup Request message previously transmitted from the first network element to the second network element; and a PFCP Association Update Response message in response to a PFCP Association Setup Update message previously transmitted from the first network element to the second network element. In some embodiments, the first network element may be a Control Plane (CP) function, and the second network element may be a User Plane (UP) function. In some embodiments, the first indicator may be an information element (IE) comprised in the first message. In some embodiments, the first message may comprise one or more fifth indicators indicating one or more network instances supported by the second network element for data forwarding. In some embodiments, each of the fifth indicators may be an IE comprised in the first message.

In some embodiments, the first message may further comprise a sixth indicator indicating a target area towards which IP connectivity is enabled by at least one of the network instances indicated by the fifth indicators. In some embodiments, the sixth indicator may indicate a target area towards which IP connectivity is enabled by one of the network instances indicated by the fifth indicators. In some embodiments, the sixth indicator may comprise a list of Tracking Area Information (TAI) or a list of NG-RAN IDs.

In some embodiments, the first network element may be a Domain Name System (DNS) server. In some embodiments, the first message may be a first request message which requests adding or updating a Name Authority PoinTeR (NAPTR) DNS record at the first network element, and the NAPTR DNS record may indicate that the second network element or another network element supports the data forwarding function. In some embodiments, the method may further comprise: receiving, from a third network element, a second request message comprising a third indicator indicating a query for network elements having the data forwarding function. In some embodiments, the method may further comprise: transmitting, to the third network element, a second response message comprising a list of one or more fourth indicators, each of the one or more fourth indicators indicating a network element having the data forwarding function. In some embodiments, the second network element may be one of the one or more network elements indicated by the one or more fourth indicators. In some embodiments, the third network element may be one of an Mobility Management Entity (MME) and an SGW-C.

FIG. 7

Figure 7:
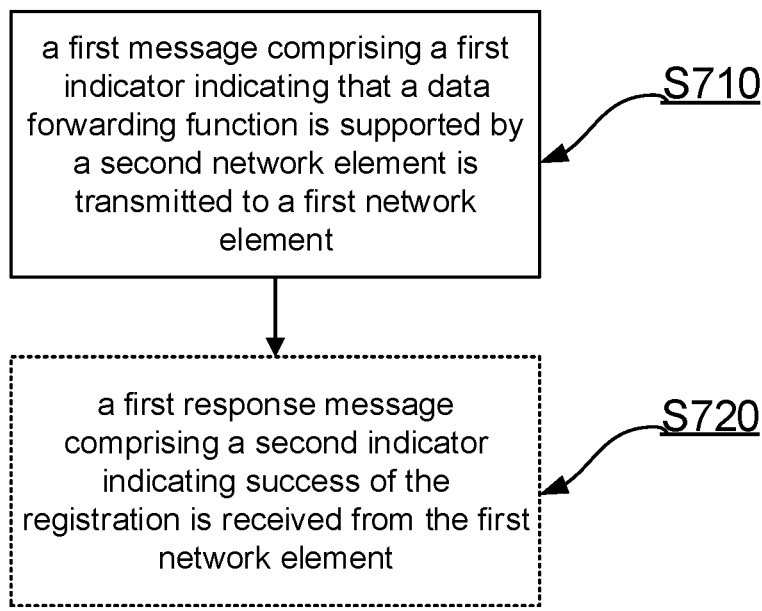
FIG. 7 is a flow chart illustrating an exemplary method at a second network element for facilitating data forwarding according to an embodiment of the present disclosure.

FIG. 7 is a flow chart of an exemplary method 700 for facilitating data forwarding according to an embodiment of the present disclosure. The method 700 may be performed at a second network element (e.g. the UPF 155 shown in FIG. 1, the Forwarding UPF 245 shown in FIG. 2, the NF Service Consumer 410 shown in FIG. 4A, the UP function 510 shown in FIG. 5A and FIG. 5B, or the network element 900 shown in FIG. 9) for facilitating data forwarding. The method 700 may comprise step S710 and an optional Step S720. However, the present disclosure is not limited thereto. In some other embodiments, the method 700 may comprise more steps, less steps, different steps or any combination thereof. Further the steps of the method 700 may be performed in a different order than that described herein. Further, in some embodiments, a step in the method 700 may be split into multiple sub-steps and performed by different entities, and/or multiple steps in the method 700 may be combined into a single step.

The method 700 may begin at step S710 where a first message comprising a first indicator indicating that a data forwarding function is supported by the second network element is transmitted to a first network element. In some embodiments, the first message may be a first request message which requests registering, at the first network element, one or more functions of the second network element comprising the data forwarding function.

At step S720, a first response message comprising a second indicator indicating success of the registration may be received from the first network element.

In some embodiments, the first network element may be a Network Repository Function (NRF), and the second network element may be a User Plane Function (UPF) or Serving GateWay for User plane (SGW-U). In some embodiments, the first request message may be a request message for Nnrf_NFManagement service, and the first response message may be a response message for Nnrf_NFManagement service. In some embodiments, the first indicator may be an attribute of the data type "UpfInfo" comprised in the first request message. In some embodiments, the first message may comprise one or more fifth indicators indicating one or more network instances supported by the second network element for data forwarding. In some embodiments, each of the fifth indicators may be an attribute of the data type "UpfInfo" comprised in the first request message. In some embodiments, the first message may be one of: a Packet Forwarding Control Plane (PFCP) Association Setup Request message; PFCP Association Update Request message; a PFCP Association Setup Response message in response to a PFCP Association Setup Request message previously transmitted from the first network element to the second network element; and a PFCP Association Update Response message in response to a PFCP Association Setup Update message previously transmitted from the first network element to the second network element.

In some embodiments, the first network element may be a Control Plane (CP) function, and the second network element may be a User Plane (UP) function. In some embodiments, the first indicator may be an information element (IE) comprised in the first message. In some embodiments, the first message may comprise one or more fifth indicators indicating one or more network instances supported by the second network element for data forwarding. In some embodiments, each of the fifth indicators may be an IE comprised in the first message. In some embodiments, the first message may further comprise a sixth indicator indicating a target area towards which IP connectivity is enabled by at least one of the network instances indicated by the fifth indicators. In some embodiments, the sixth indicator may indicate a target area towards which IP connectivity is enabled by one of the network instances indicated by the fifth indicators. In some embodiments, the sixth indicator may comprise a list of Tracking Area Information (TAI) or a list of NG-RAN IDs.

In some embodiments, the first network element may be a Domain Name System (DNS) server. In some embodiments, the first message may be a first request message which requests adding or updating a Name Authority PoInTeR (NAPTR) DNS record at the first network element, and the NAPTR DNS record may indicate that the second network element or another network element supports the data forwarding function.

FIG. 8

Figure 8:
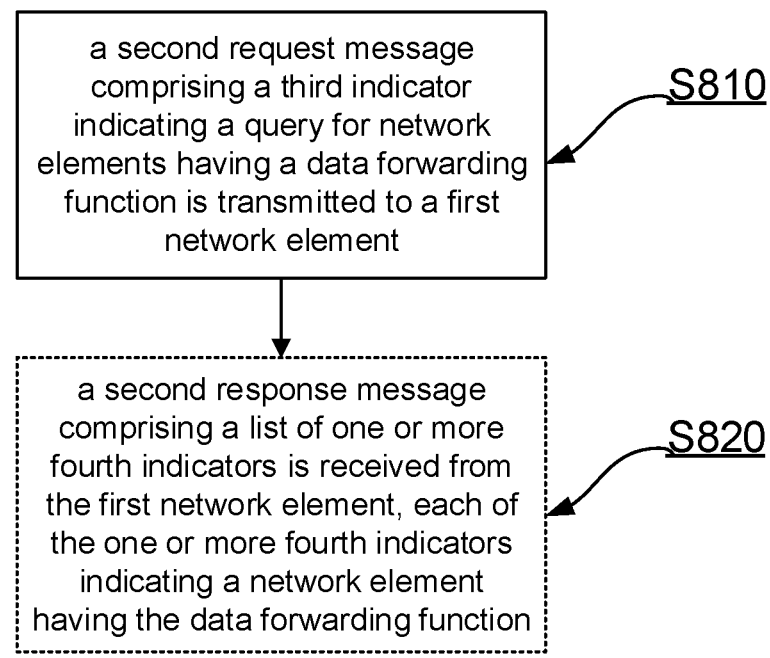
FIG. 8 is a flow chart illustrating an exemplary method at a third network element for facilitating data forwarding according to an embodiment of the present disclosure.

FIG. 8 is a flow chart of an exemplary method 800 for facilitating data forwarding according to an embodiment of the present disclosure. The method 800 may be performed at a third network element (e.g. the SMF 115 shown in FIG. 1, the SMF 230 shown in FIG. 2, the NF Service Consumer 430 shown in FIG. 4B, the CP function 520 shown in FIG. 5A and FIG. 5B, or the network element 900 shown in FIG. 9) for facilitating data forwarding. The method 800 may comprise step S810 and an optional Step S820. However, the present disclosure is not limited thereto. In some other embodiments, the method 800 may comprise more steps, less steps, different steps or any combination thereof. Further the steps of the method 800 may be performed in a different order than that described herein. Further, in some embodiments, a step in the method 800 may be split into multiple sub-steps and performed by different entities, and/or multiple steps in the method 800 may be combined into a single step.

The method 800 may begin at step S810 where a second request message comprising a third indicator indicating a query for network elements having a data forwarding function is transmitted to a first network element.

At step S820, a second response message comprising a list of one or more fourth indicators is received from the first network element, each of the one or more fourth indicators indicating a network element having the data forwarding function.

In some embodiments, the third network element may be a Session Management Function (SMF), Mobility Management Entity (MME), or a SGW for Control plane (SGW-C). In some embodiments, the second request message may be a request message for Nnrf_NFDiscovery service, and the second response message may be a response message for Nnrf_NFDiscovery service. In some embodiments, the third indicator may be a Uniform Resource Indicator (URI) query parameter comprised in the second request message. In some embodiments, for each of the one or more network elements indicated by the one or more fourth indicators, the second response message may comprise one or more fifth indicators indicating one or more network instances supported by the corresponding network element for data forwarding. In some embodiments, each of the fifth indicators may be an attribute of the data type "UpfInfo" comprised in the second response message. In some embodiments, the first network element may be a Control Plane (CP) function. In some embodiments, the first indicator may be an information element (IE) comprised in the first message. In some embodiments, the method may further comprise: selecting one of the one or more network elements indicated by the one or more fourth indicators based at least on the network instances supported by the one or more network elements and/or a location of an UE of interest. In some embodiments, the first network element may be a Domain Name System (DNS) server.

FIG. 9

Figure 9:
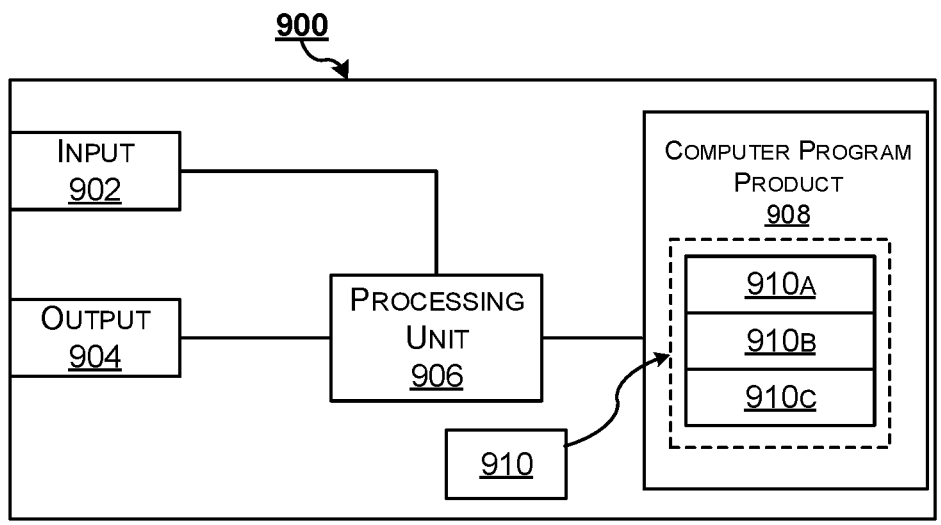
FIG. 9 schematically shows an embodiment of an arrangement which may be used in a network element according to an embodiment of the present disclosure.

FIG. 9 schematically shows an embodiment of an arrangement 900 which may be used in a network element (e.g., the first network element, the second network element, or the third network element) according to an embodiment of the present disclosure. Comprised in the arrangement 900 are a processing unit 906, e.g., with a Digital Signal Processor (DSP) or a Central Processing Unit (CPU). The processing unit 906 may be a single unit or a plurality of units to perform different actions of procedures described herein. The arrangement 900 may also comprise an input unit 902 for receiving signals from other entities, and an output unit 904 for providing signal(s) to other entities. The input unit 902 and the output unit 904 may be arranged as an integrated entity or as separate entities.

Furthermore, the arrangement 900 may comprise at least one computer program product 908 in the form of a non-volatile or volatile memory, e.g., an Electrically Erasable Programmable Read-Only Memory (EEPROM), a flash memory and/or a hard drive. The computer program product 908 comprises a computer program 910, which comprises code/computer readable instructions, which when executed by the processing unit 906 in the arrangement 900 causes the arrangement 900 and/or the network elements in which it is comprised to perform the actions, e.g., of the procedure described earlier in conjunction with FIG. 3A to FIG. 8 or any other variant.

The computer program 910 may be configured as a computer program code structured in a computer program module 910A. Hence, in an exemplifying embodiment when the arrangement 900 is used in a first network element, the code in the computer program of the arrangement 900 includes: a reception module 910A for receiving, from a second network element, a first message comprising a first indicator indicating that a data forwarding function is supported by the second network element.

Further, the computer program 910 may be configured as a computer program code structured in a computer program module 910B. Hence, in an exemplifying embodiment when the arrangement 900 is used in a second network element, the code in the computer program of the arrangement 900 includes: a transmission module 910B for transmitting, to a first network element, a first message comprising a first indicator indicating that a data forwarding function is supported by the second network element.

Furthermore, the computer program 910 may be configured as a computer program code structured in a computer program module 910C. Hence, in an exemplifying embodiment when the arrangement 900 is used in a third network element, the code in the computer program of the arrangement 900 includes: a transmission module 910C for transmitting, to a first network element, a second request message comprising a third indicator indicating a query for network elements having a data forwarding function.

The computer program modules could essentially perform the actions of the flow illustrated in FIG. 3A to FIG. 8, to emulate the network elements. In other words, when the different computer program modules are executed in the processing unit 906, they may correspond to different modules in the various network elements.

Although the code means in the embodiments disclosed above in conjunction with FIG. 9 are implemented as computer program modules which when executed in the processing unit causes the arrangement to perform the actions described above in conjunction with the figures mentioned above, at least one of the code means may in alternative embodiments be implemented at least partly as hardware circuits.

The processor may be a single CPU (Central processing unit), but could also comprise two or more processing units. For example, the processor may include general purpose microprocessors; instruction set processors and/or related chips sets and/or special purpose microprocessors such as Application Specific Integrated Circuit (ASICs). The processor may also comprise board memory for caching purposes. The computer program may be carried by a computer program product connected to the processor. The computer program product may comprise a computer readable medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories within the UE.

The present disclosure is described above with reference to the embodiments thereof. However, those embodiments are provided just for illustrative purpose, rather than limiting the present disclosure. The scope of the disclosure is defined by the attached claims as well as equivalents thereof. Those skilled in the art can make various alternations and modifications without departing from the scope of the disclosure, which all fall into the scope of the disclosure.

SOME EMBODIMENTS

Some of the embodiments that are described above can be summarized in the following manner:

1. A method at a first network element for facilitating data forwarding, the method comprising:
   receiving, directly or indirectly, from a second network element, a first information comprising a first indicator indicating that a data forwarding function is supported by the second network element.

2. The method of embodiment 1, wherein the first message is a first request message which requests registering, at the first network element, one or more functions of the second network element comprising the data forwarding function.

3. The method of embodiment 2, further comprising:
   transmitting, to the second network element, a first response message comprising a second indicator indicating success of the registration.

4. The method of embodiment 3, wherein the first network element is a Network Repository Function (NRF) or a Domain Name Server (DNS), and the second network element is a User Plane Function (UPF) or Serving GateWay for User plane (SGW-U).

5. The method of embodiment 4, wherein the first request message is a request message for Nnrf_NFManagement service, and the first response message is a response message for Nnrf_NFManagement service.

6. The method of embodiment 5, wherein the first indicator is an attribute of the data type "UpfInfo" comprised in the first request message.

7. The method of embodiment 6, wherein the said attribute is preferably named as "dataforwarding" indicating if the UPF supports data forwarding function.

8. The method of embodiment 7, wherein the first indicator is at least a new interface type in the attribute UPInterfaceType in the data type "InterfaceUpfInfoItem" comprised in the first request message.

9. The method of embodiment 8, wherein the said new interface type is named as "data forwarding".

10. The method of embodiment 9, wherein the said new interface type is provisioned together with a network instance identifying a transport slice enabling data forwarding between two entities.

11. The method of embodiment 2 or 3, further comprising:
    receiving, from a third network element, a second request message comprising a third indicator indicating a query for network elements having the data forwarding function.

12. The method of embodiment 11, further comprising:
    transmitting, to the third network element, a second response message comprising a list of one or more fourth indicators, each of the one or more fourth indicators indicating a network element having the data forwarding function.

13. The method of embodiment 12, wherein the second network element is one of the one or more network elements indicated by the one or more fourth indicators.

14. The method of embodiment 11, wherein the third network element is a Session Management Function (SMF), a Mobility Management Entity (MME), or a SGW for Control plane (SGW-C).

15. The method of embodiment 14, wherein the second request message is a request message for Nnrf_NFDiscovery service, and the second response message is a response message for Nnrf_NFDiscovery service.

16. The method of embodiment 15, wherein the third indicator is a Uniform Resource Indicator (URI) query parameter comprised in the second request message.

17. The method of embodiment 1, wherein the first message comprises one or more fifth indicators indicating one or more network instances supported by the second network element for data forwarding.

18. The method of embodiment 12, wherein for each of the one or more network elements indicated by the one or more fourth indicators, the second response message comprises one or more fifth indicators indicating one or more network instances supported by the corresponding network element for data forwarding.

19. The method of embodiment 17 or 18, wherein each of the fifth indicators is an attribute of the data type "UpfInfo" comprised in the first request message or in the second response message.

20. The method of embodiment 1, wherein the first message is one of:
a Packet Forwarding Control Plane (PFCP) Association Setup Request message;
a PFCP Association Update Request message;
a PFCP Association Setup Response message in response to a PFCP Association Setup Request message previously transmitted from the first network element to the second network element; and
a PFCP Association Update Response message in response to a PFCP Association Setup Update message previously transmitted from the first network element to the second network element.

21. The method of embodiment 20, wherein the first network element is a Control Plane (CP) function, and the second network element is a User Plane (UP) function.

22. The method of embodiment 20, wherein the first indicator is an information element (IE) comprised in the first message.

23. The method of embodiment 20, wherein the first message comprises one or more fifth indicators indicating one or more network instances supported by the second network element for data forwarding.

24. The method of embodiment 23, wherein each of the fifth indicators is an IE comprised in the first message.

25. The method of any of embodiment 1-24, wherein the first message further comprises a sixth indicator indicating a target area towards which IP connectivity is enabled by at least one of the network instances indicated by the fifth indicators.

26. The method of embodiment 25, wherein the sixth indicator indicates a target area towards which IP connectivity is enabled by one of the network instances indicated by the fifth indicators.

27. The method of embodiment 25 or 26, wherein the sixth indicator comprises at least a list of Tracking Area Information (TAI) and/or a list of NG-RAN IDs and/or eNode B IDs.

28. The method of embodiment 1, wherein the first network element is a Domain Name System (DNS) server.

29. The method of embodiment 28, wherein the first message is a first request message which requests adding or updating a Name Authority PoinTeR (NAPTR) DNS record at the first network element, and the NAPTR DNS record indicates that the second network element or another network element supports the data forwarding function.

30. The method of embodiment 28, further comprising:
receiving, from a third network element, a second request message comprising a third indicator indicating a query for network elements having the data forwarding function.

31. The method of embodiment 30, further comprising:
transmitting, to the third network element, a second response message comprising a list of one or more fourth indicators, each of the one or more fourth indicators indicating a network element having the data forwarding function.

32. The method of embodiment 31, wherein the second network element is one of the one or more network elements indicated by the one or more fourth indicators.

33. The method of embodiment 28, wherein the third network element is one of an Mobility Management Entity (MME) and an SGW-C.

34. A first network element, comprising:
a processor;
a memory storing instructions which, when executed by the processor, cause the processor to perform the method of any of embodiment 1-33.

35. A method at a second network element for facilitating data forwarding, the method comprising:
transmitting, to a first network element, a first message comprising a first indicator indicating that a data forwarding function is supported by the second network element.

36. The method of embodiment 35, wherein the first message is a first request message which requests registering, at the first network element, one or more functions of the second network element comprising the data forwarding function.

37. The method of embodiment 36, further comprising:
receiving, from the first network element, a first response message comprising a second indicator indicating success of the registration.

38. The method of embodiment 37, wherein the first network element is a Network Repository Function (NRF), and the second network element is a User Plane Function (UPF) or Serving GateWay for User plane (SGW-U).

39. The method of embodiment 38, wherein the first request message is a request message for Nnrf_NFManagement service, and the first response message is a response message for Nnrf_NFManagement service.

40. The method of embodiment 36, wherein the first indicator is an attribute of the data type "UpfInfo" comprised in the first request message.

41. The method of embodiment 35, wherein the first message comprises one or more fifth indicators indicating one or more network instances supported by the second network element for data forwarding.

42. The method of embodiment 41, wherein each of the fifth indicators is an attribute of the data type "UpfInfo" comprised in the first request message.

43. The method of embodiment 35, wherein the first message is one of:
a Packet Forwarding Control Plane (PFCP) Association Setup Request message;
a PFCP Association Update Request message;
a PFCP Association Setup Response message in response to a PFCP Association Setup Request message previously transmitted from the first network element to the second network element; and
a PFCP Association Update Response message in response to a PFCP Association Setup Update message previously transmitted from the first network element to the second network element.

44. The method of embodiment 43, wherein the first network element is a Control Plane (CP) function, and the second network element is a User Plane (UP) function.

45. The method of embodiment 44, wherein the first indicator is an information element (IE) comprised in the first message.

46. The method of embodiment 43, wherein the first message comprises one or more fifth indicators indicating one or more network instances supported by the second network element for data forwarding.

47. The method of embodiment 46, wherein each of the fifth indicators is an IE comprised in the first message.

48. The method of any of embodiment 35-47, wherein the first message further comprises a sixth indicator indicating a target area towards which IP connectivity is enabled by at least one of the network instances indicated by the fifth indicators.

49. The method of embodiment 48, wherein the sixth indicator indicates a target area towards which IP connectivity is enabled by one of the network instances indicated by the fifth indicators.

50. The method of embodiment 48 or 49, wherein the sixth indicator comprises a list of Tracking Area Information (TAI) or a list of NG-RAN IDs.

51. The method of embodiment 35, wherein the first network element is a Domain Name System (DNS) server.

52. The method of embodiment 51, wherein the first message is a first request message which requests adding or updating a Name Authority PoinTeR (NAPTR) DNS record at the first network element, and the NAPTR DNS record indicates that the second network element or another network element supports the data forwarding function.

53. A second network element, comprising:
a processor;
a memory storing instructions which, when executed by the processor, cause the processor to perform the method of any of embodiment 35-52.

54. A method at a third network element for facilitating data forwarding, the method comprising:
transmitting, to a first network element, a second request message comprising a third indicator indicating a query for network elements having a data forwarding function.

55. The method of embodiment 54, further comprising:
receiving, from the first network element, a second response message comprising a list of one or more fourth indicators, each of the one or more fourth indicators indicating a network element having the data forwarding function.

56. The method of embodiment 55, wherein the third network element is a Session Management Function (SMF), Mobility Management Entity (MME), or a SGW for Control plane (SGW-C).

57. The method of embodiment 56, wherein the second request message is a request message for Nnrf_NFDiscovery service, and the second response message is a response message for Nnrf_NFDiscovery service.

58. The method of embodiment 57, wherein the third indicator is a Uniform Resource Indicator (URI) query parameter comprised in the second request message.

59. The method of embodiment 55, wherein for each of the one or more network elements indicated by the one or more fourth indicators, the second response message comprises one or more fifth indicators indicating one or more network instances supported by the corresponding network element for data forwarding.

60. The method of embodiment 59, wherein each of the fifth indicators is an attribute of the data type "UpfInfo" comprised in the second response message.

61. The method of embodiment 54, wherein the first network element is a Control Plane (CP) function.

62. The method of embodiment 61, wherein the first indicator is an information element (IE) comprised in the first message.

63. The method of embodiment 54, further comprising:
selecting one of the one or more network elements indicated by the one or more fourth indicators based at least on the network instances supported by the one or more network elements and/or a location of an UE of interest.

64. The method of embodiment 54, wherein the first network element is a Domain Name System (DNS) server.

65. A third network element, comprising:
a processor;
a memory storing instructions which, when executed by the processor, cause the processor to perform the method of any of embodiments 54-64.

66. A telecommunications system, comprising:
a first network element of embodiment 34;
a second network element of embodiment 53; and
a third network element of embodiment 65.

67. A non-transitory computer readable storage medium storing instructions which, when executed by a processor, cause the processor to perform the method of any of embodiment 1-33, 35-52, and 54-64.

What is claimed is:

1. A method at a Network Repository Function (NRF) for facilitating data forwarding, the method comprising:
receiving, directly or indirectly, from a forwarding User Plane Function (UPF), an HTTP PUT request message comprising a first indicator indicating that a data forwarding function is supported by the forwarding UPF dedicated for data forwarding between a source cell and a target cell of a User Equipment (UE);
receiving from a Session Management Function (SMF) a HTTP GET request message comprising filter criteria included in query parameters which indicate that the SMF searches for a UPF having a data forwarding function; and
transmitting, to the SMF, a HTTP 200 OK response message comprising a validity period, during which the received search result can be cached by the SMF and an array of NF Profile objects that satisfy the filter criteria.

2. A Network Repository Function (NRF), comprising:
a processor; and
a memory storing instructions which, when executed by the processor, cause the processor to:
receive, directly or indirectly, from a forwarding User Plane Function (UPF), an HTTP PUT request message comprising a first indicator indicating that a data forwarding function is supported by the forwarding UPF dedicated for data forwarding between a source cell and a target cell of a User Equipment (UE);
receive from a Session Management Function (SMF) a HTTP GET request message comprising filter criteria included in query parameters which indicate that the SMF searches for a UPF having a data forwarding function; and
transmit, to the SMF, a HTTP 200 OK response message comprising a validity period, during which the received search result can be cached by the SMF and an array of NF Profile objects that satisfy the filter criteria.

\* \* \* \* \*